United States Patent
Ino et al.

(10) Patent No.: US 8,034,880 B2
(45) Date of Patent: Oct. 11, 2011

(54) METHOD FOR PRODUCING—$SO_3H$ GROUP-CONTAINING FLUOROPOLYMER AND—$SO_3H$ GROUP-CONTAINING FLUOROPOLYMER

(75) Inventors: Tadashi Ino, Osaka (JP); Tadaharu Isaka, Osaka (JP); Masahiro Kondo, Osaka (JP); Masanori Ikeda, Shizuoka (JP); Nobuyuki Uematsu, Shizuoka (JP); Takehiro Koga, Kanagawa (JP)

(73) Assignees: Daikin Industries, Ltd., Osaka (JP); Asahi Kasei E-Materials Corporation, Tokyo (JP)

( * ) Notice: Subject to any disclaimer, the term of this patent is extended or adjusted under 35 U.S.C. 154(b) by 0 days.

(21) Appl. No.: 12/831,109

(22) Filed: Jul. 6, 2010

(65) Prior Publication Data

US 2010/0273088 A1  Oct. 28, 2010

Related U.S. Application Data

(62) Division of application No. 12/278,084, filed as application No. PCT/JP2007/051947 on Feb. 5, 2007, now Pat. No. 7,776,970.

(30) Foreign Application Priority Data

Feb. 3, 2006  (JP) .................................. 2006-027375

(51) Int. Cl.
C08F 8/22  (2006.01)
(52) U.S. Cl. ..................... 525/340; 525/326.4; 525/343; 525/355; 525/356

(58) Field of Classification Search ............... 525/326.4, 525/340, 343, 355, 356
See application file for complete search history.

(56) References Cited

U.S. PATENT DOCUMENTS

| | | |
|---|---|---|
| 2006/0063903 A1 | 3/2006 | Kasahara et al. |
| 2007/0129500 A1 | 6/2007 | Honda et al. |

FOREIGN PATENT DOCUMENTS

| | | |
|---|---|---|
| EP | 1 596 453 A1 | 11/2005 |
| EP | 1 635 412 A1 | 3/2006 |
| EP | 1 666 508 A1 | 6/2006 |
| JP | 46-023245 B1 | 7/1971 |
| JP | 53-304033 A | 12/1988 |
| JP | 63-304033 A | 12/1988 |
| JP | 2004-18673 A | 1/2004 |
| JP | 2006-299092 A | 11/2006 |
| WO | 2004/066426 A1 | 8/2004 |
| WO | 2004/102714 A1 | 11/2004 |
| WO | 2005/028522 A1 | 3/2005 |
| WO | 2008/046816 A1 | 4/2008 |

*Primary Examiner* — Bernard Lipman
(74) *Attorney, Agent, or Firm* — Sughrue Mion, PLLC

(57) ABSTRACT

The present invention provides a novel production process by which unstable terminal groups can be sufficiently stabilized under mild conditions. The present invention is related to a method for producing an —$SO_3H$ group-containing fluoropolymer wherein a fluoropolymer to be treated having a —$SO_2X$ group-containing monomer unit (X representing F or Cl) is subjected to a procedure comprising at least the steps A, B and C defined below in that order:
  A: Step of reacting with a halogenating agent;
  B: Step of reacting with a decomposition treatment agent;
  C: Step of reacting with a fluorinating agent.

14 Claims, No Drawings

METHOD FOR PRODUCING —SO₃H GROUP-CONTAINING FLUOROPOLYMER AND —SO₃H GROUP-CONTAINING FLUOROPOLYMER

CROSS REFERENCE TO THE RELATED APPLICATIONS

This application is a Divisional of U.S. patent application Ser. No. 12/278,084 filed Aug. 1, 2008, which is a 371 of PCT Application No. PCT/JP2007/051947 filed Feb. 5, 2007 and which claims benefit of JPA No. 2006-027375 filed Feb. 3, 2006. The above-noted applications are incorporated herein by reference in their entirety.

TECHNICAL FIELD

The present invention relates to a method of producing an —SO₃H group-containing fluoropolymer, an —SO₃H group-containing fluoropolymer, a polyelectrolyte comprising such fluoropolymer, and an electrode catalyst layer, a membrane/electrode assembly and a solid polymer electrolyte fuel cell, each comprising such fluoropolymer.

BACKGROUND ART

Those —SO₃H group-containing fluoropolymers which are obtainable by copolymerization of a fluoromonomer and an —SO₂F group-containing perfluorovinyl ether are known to be useful as electrolyte membrane materials for use in fuel cells, chemical sensors and the like.

Reportedly, those —SO₃H group-containing fluoropolymers have a problem; when they are used as fuel cell electrolytes for a long period of time, fluoride ions are eluted from fuel cells into wastewater as a result of degradation thereof.

The cause thereof is presumably the decomposition of those —CO₂H groups which are unstable terminal groups in the fluoropolymer due to hydroxyl radicals generated in the fuel cell (cf. e.g. Non-Patent Document 1).

To solve this problem, a treatment method has been reported in Patent Document 1 which comprises bringing a sulfonyl group-containing fluoropolymer in a solid state into contact with a fluorine radical-generating compound such as fluorine gas at 20 to 300° C. to convert at least 40% of unstable terminal groups in the polymer chain to stable terminal groups. In Patent Document 2, there is reported a method of obtaining stable polymers by 0.1 hour or a longer period of treatment at a temperature of 200 to 300° C. under vacuum (at a pressure not higher than 0.02 MPa), followed by contacting with fluorine gas at a temperature of 150 to 200° C.

Further, in Patent Document 3, there is proposed a method of sufficiently stabilizing sulfonyl group-containing fluoropolymers containing carboxylic acid groups as main unstable groups which method comprises fluorine treatment under controlled moisture conditions.

These prior art technologies are to treat fluoropolymers having —COF, —COOH, —CF=CF₂ and/or —CF₂H groups as unstable groups. However, fluoropolymers have, in addition to those mentioned above, other unstable groups such as —CH₂OR and —COOR (in each formula, R representing H or a hydrocarbon group) derived from the polymerization initiator, chain transfer agent and terminator, among others; the prior art technologies cannot stabilize such unstable groups to a sufficient extent, so that when the fluoropolymers are used in fuel cells, for instance, any sufficient level of durability cannot be realized.

Further, when, as proposed in Patent Document 2, fluorine gas treatment is carried out at such a high temperature as 150° C. or above, unstable groups are newly formed due to cleavage of the polymer main chain with the progress of treatment, hence no satisfactory stabilizing effect can be obtained. Further, the fluorine gas treatment is accompanied by simultaneous formation of crosslinked structures and, therefore, when the fluorine treatment is followed by melting and molding, the moldability of the polymer obtained is not always satisfactory (cf. Patent Document 4). Furthermore, sulfonyl group-containing fluoropolymers generally have a softening temperature of not higher than 200° C., and the polymers obtained by this method, even when used in the form of powders or pellets, become lumpy or sheet-like as a result of fusion and thus are very poor in handleability.

In view of the foregoing, a technology of stabilizing fluoropolymers under mild conditions and with good efficiency has been desired.

Patent document 1: Japanese Kokai Publication Sho-46-23245
Patent document 2: International Publication No. 2004/102714
Patent document 3: International Publication No. 2005/28522
Patent document 4: Japanese Kokai Publication 2004-18673
Non-Patent Document 1: Dennis E. Curtin, Robert D. Lousenberg, Timothy J. Henry, Paul C. Tangeman and Monica E. Tisack, Preprints for The 10th Fuel Cell Symposium, page 121 (2003).

DISCLOSURE OF INVENTION

Problems which the Invention is to Solve

In view of the above-discussed state of the art, it is an object of the present invention to provide a novel production process by which unstable terminal groups can be sufficiently stabilized under mild conditions.

Means for Solving the Problems

The present inventors made intensive investigations in an attempt to accomplish the above object and, as a result, found that when a fluoropolymer to be treated having —SO₂X group-containing monomer units (X representing F or Cl) is subjected to a procedure comprising at least the steps A, B and C defined below in that order or to a terminus stabilizing treatment comprising the steps P and Q defined below, the —SO₃H group-containing fluoropolymer can be terminally stabilized under relatively mild conditions. Such finding has led to completion of the present invention.

Thus, the present invention relates to:
(1) a method for producing an —SO₃H group-containing fluoropolymer, wherein a fluoropolymer to be treated containing a —SO₂X group-containing monomer unit (X representing F or Cl) is subjected to a procedure comprising at least the steps A, B and C defined below in which in that order:
  A: Step of reacting with a halogenating agent;
  B: Step of reacting with a decomposition treatment agent;
  C: Step of reacting with a fluorinating agent.
(Hereinafter, this production process is sometimes referred to as "method for producing an —SO₃H group-containing fluoropolymer (1)");
(2) the method for producing an —SO₃H group-containing fluoropolymer according to (1), wherein the fluoropolymer to be treated has an unstable terminal group;

(3) the method for producing an —SO$_3$H group-containing fluoropolymer according to (2), wherein the step A is a step A1 of converting the unstable terminal group to a readily degradable terminal group by reacting with the halogenating agent, the step B is a step B1 of converting the readily degradable terminal group to a —CFTCO$_2$Z group by reacting with the decomposition treatment agent, and the step C is a step C1 of converting the —CFTCO$_2$Z group to a —CF$_2$T group by reacting with the fluorinating agent (where T represents F, a perfluoroalkyl group of 1 to 10 carbon atoms or a perfluoroalkoxy group of 2 to 15 carbon atoms and Z represents H or NR$^1$R$^2$R$^3$R$^4$ or an alkali metal element; R$^1$, R$^2$, R$^3$ and R$^4$, each of which is the same or different, represents H or an alkyl group of 1 to 4 carbon atoms; the perfluoroalkyl group and perfluoroalkoxy group each optionally has an ether oxygen [—O—] and/or an —SO$_2$X group (X being as defined above));

(4) the method for producing an —SO$_3$H group-containing fluoropolymer according to (3), wherein the readily degradable terminal group is of at least one species selected from the group consisting of —CFTCOX$^1$ and —CFTCO$_2$Rx (T being as defined above, X$^1$ representing F or Cl and Rx representing a haloalkyl group);

(5) the method for producing an —SO$_3$H group-containing fluoropolymer according to any one of (1) to (4), wherein the halogenating agent comprises at least one species selected from the group consisting of F$_2$, Cl$_2$, Br$_2$, NF$_3$, PCl$_3$, PCl$_5$, SF$_4$, SCl$_2$, SCl$_4$, ClF, ClF$_3$, BrF$_3$, IF$_5$, POCl$_3$, SOCl$_2$ and R$^{16}$R$^{17}$NSF$_3$ (R$^{16}$ and R$^{17}$, which is the same or different, each representing an alkyl group containing 1 to 3 carbon atoms);

(6) the method for producing an —SO$_3$H group-containing fluoropolymer according to any one of (1) to (5), wherein, in the step A, the reaction with the halogenating agent is carried out at a temperature not lower than 0° C. but lower than 150° C.;

(7) the method for producing an —SO$_3$H group-containing fluoropolymer according to any one of (1) to (6), wherein the decomposition treatment agent is water;

(8) a method for producing an —SO$_3$H group-containing fluoropolymer comprising terminal stabilization treatment of a fluoropolymer to be treated having an —SO$_2$X group-containing monomer unit and an unstable terminal group wherein the terminal stabilization treatment comprises the steps P and Q defined below (Hereinafter, this production process is sometimes referred to as "method for producing an —SO$_3$H group-containing fluoropolymer (2)" and the method for producing an —SO$_3$H group-containing fluoropolymer (1) and the method for producing an —SO$_3$H group-containing fluoropolymer (2) are sometimes collectively referred to as "method for producing an —SO$_3$H group-containing fluoropolymer of the present invention"):

P: Step of obtaining an —SO$_3$H group-containing fluoropolymer in which at least 90% of the unstable terminal groups are —CFTCO$_2$Z groups;

Q: Step of converting the —CFTCO$_2$Z groups to —CF$_2$T groups by reacting with a fluorinating agent (where T, Z and X are as defined above);

(9) the method for producing an —SO$_3$H group-containing fluoropolymer according to any one of (1) to (8), wherein the fluorinating agent is a fluorinating agent comprising at least one fluorine source selected from the group consisting of F$_2$, NF$_3$, PF$_5$, SF$_4$, IF$_5$, K$_3$NiF$_7$, ClF and ClF$_3$;

(10) the method for producing an —SO$_3$H group-containing fluoropolymer according to (9), wherein the fluorinating agent is gaseous and the fluorine source amounts to 1% by mass or larger of the fluorinating agent;

(11) the method for producing an —SO$_3$H group-containing fluoropolymer according to (9) or (10), wherein the fluorine source is F$_2$;

(12) the method for producing an —SO$_3$H group-containing fluoropolymer according to any one of (1) to (11), wherein the fluorinating agent is allowed to react at a temperature not lower than 0° C. but lower than 150° C.;

(13) the method for producing an —SO$_3$H group-containing fluoropolymer according to any one of (1) to (12), wherein the fluoropolymer to be treated is a copolymer based on a repeating unit (α) derived from a sulfonyl group-containing perhalovinyl ether represented by the following general formula (I):

$$CF_2=CF-O-(CF_2CFY^1-O)_n-(CFY^2)_m-SO_2X \qquad (I)$$

(wherein, Y$^1$ represents F, Cl or a perfluoroalkyl group, n represents an integer of 0 to 3 and n atoms of Y$^1$ are the same or different; Y$^2$ represents F or Cl, m represents an integer of 2 to 6 and m atoms of Y$^2$ are the same or different; and X is defined above), and a repeating unit (β) derived from an ethylenic fluoromonomer copolymerizable with the sulfonyl group-containing perhalovinyl ether, the repeating unit (α) amounting to 5 to 50 mole percent and the repeating unit (β) amounting to 50 to 95 mole percent in the copolymer, with the sum of the repeating unit (α) and the repeating unit (β) contents being 95 to 100 mole percent;

(14) the method for producing an —SO$_3$H group-containing fluoropolymer according to (13), wherein, in the above general formula (I), n is 0 or 1;

(15) the method for producing an —SO$_3$H group-containing fluoropolymer according to (13) or (14), wherein, in the above general formula (I), Y$^2$ is F and m is an integer of 2 to 6;

(16) an —SO$_3$H group-containing fluoropolymer which is obtained by the method for producing an —SO$_3$H group-containing fluoropolymer according to any one of (1) to (15);

(17) an —SO$_3$H group-containing fluoropolymer wherein a 170-µm-thick membrane made of the —SO$_3$H group-containing fluoropolymer, upon Fenton treatment, gives a fluoride ion elution level of 8.0×10$^{-4}$ parts by mass or lower per 100 parts by mass of the membrane;

(18) an —SO$_3$H group-containing fluoropolymer obtained by the method for producing an —SO$_3$H group-containing fluoropolymer according to any one of (1) to (15) wherein a 170-µm-thick membrane made of the —SO$_3$H group-containing fluoropolymer, upon Fenton treatment, gives a fluoride ion elution level of 8.0×10$^{-4}$ parts by mass or lower per 100 parts by mass of the membrane;

(19) a polymer electrolyte membrane which comprises the —SO$_3$H group-containing fluoropolymer according to any one of (16) to (18);

(20) an electrode catalyst layer which comprises the —SO$_3$H group-containing fluoropolymer according to any one of (16) to (18);

(21) a membrane/electrode assembly comprising a polymer electrolyte membrane, which assembly satisfies at least one requirement selected from the group consisting of the requirements (1) and (2) given below:

(1) The polymer electrolyte membrane is the polymer electrolyte membrane according to (19);

(2) The electrode comprises the electrode catalyst layer according to (20); and

(22) a solid polymer electrolyte fuel cell which comprises the membrane/electrode assembly according to (21).

Effects of the Invention

The method for producing an —SO$_3$H group-containing fluoropolymer according to the present invention, which has such a constitution as described above, can stabilize unstable terminal groups under mild and economical reaction conditions and further can lighten restrictions on the apparatus and materials to be used; in each step, the decomposition of the fluoropolymer to be treated under treatment hardly occurs and unnecessary crosslinked structures are hardly generated in the fluoropolymer.

The —SO$_3$H group-containing fluoropolymer according to the present invention has a greatly reduced unstable terminal group content and, therefore, is excellent in chemical stability and various other characteristics.

The electrode catalyst layer, polyelectrolyte membrane, membrane/electrode assembly and solid polymer electrolyte fuel cell according to the present invention each comprises the —SO$_3$H group-containing fluoropolymer of the present invention and therefore is excellent in durability and various other characteristics.

BEST MODES FOR CARRYING OUT THE INVENTION

The present invention is now described in detail. The method for producing an —SO$_3$H group-containing fluoropolymer of the present invention is a method in which a fluoropolymer to be treated having a —SO$_2$X group (X representing F or Cl) is sunjected to a procedure comprising the specific steps described later herein to produce an —SO$_3$H group-containing fluoropolymer. The procedure is a process for stabilizing the unstable terminal groups mentioned hereinbelow and, herein, such treatment is sometimes referred to as "unstable terminal group stabilization treatment" or briefly as "stabilization treatment".

The fluoropolymer to be treated in accordance with the present invention has —SO$_2$X group-containing monomer units (X representing F or Cl).

The content of —SO$_2$X group-containing monomer units in the above-mentioned fluoropolymer to be treated is preferably 5 to 50 mole percent relative to all monomer units. The term "all monomer units" as used herein refers to all monomer-derived units in the molecular structure of the fluoropolymer to be treated.

Generally, the —SO$_2$X group-containing monomer units are derived from one or more sulfonyl group-containing perhalovinyl ethers represented by the following general formula (I):

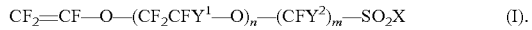

(I).

In the above formula, Y$^1$ represents F, Cl or a perfluoroalkyl group, n represents an integer of 0 to 3, n of Y$^1$s are the same or different; Y$^2$ represents F or Cl, m represents an integer of 2 to 6, m of Y$^2$s are the same or different and X represents F or Cl.

From the synthesis and operability viewpoint, it is more preferred that, in the above general formula (I), n be 0 or 1, Y$^2$ be F and m be an integer of 2 to 6, and it is still more preferred that Y$^2$ be F and m be an integer of 2 to 4.

In the fluoropolymer to be treated, one or a combination of two or more of such sulfonyl group-containing perhalovinyl ethers may be used.

The fluoropolymer to be treated in accordance with the present invention is a copolymer comprising at least one repeating unit (α) derived from a sulfonyl group-containing perhalovinyl ether and at least one repeating unit (β) derived from an ethylenic fluoromonomer copolymerizable with the sulfonyl group-containing perhalovinyl ether.

The ethylenic fluoromonomer to constitute the repeating unit (β) is a vinyl group-having monomer not having ether oxygen [—O—], the vinyl group hydrogen atoms of which is optionally partly or wholly substituted by a fluorine atom or atoms.

The "ether oxygen", so referred to herein, means the monomer molecule-constituting structure —O—.

As the above ethylenic fluoromonomer, there may be mentioned, among others, haloethylenic fluoromonomers represented by the following general formula (II):

(II)

wherein Rf$^1$ represents F, Cl or a straight or branched fluoroalkyl group of 1 to 9 carbon atoms, or hydrogen-containing fluoroethylenic fluoromonomers represented by the following general formula (III):

(III)

wherein Y$^3$ represents H or F and Y$^4$ represents H, F, Cl or a straight or branched fluoroalkyl group of 1 to 9 carbon atoms.

As the ethylenic fluoromonomer, there may be mentioned, for example, tetrafluoroethylene [TFE], hexafluoropropylene [HFP], chlorotrifluoroethylene [CTFE], vinyl fluoride, vinylidene fluoride [VDF], trifluoroethylene, hexafluoroisobutylene and perfluorobutylethylene. Among them, TFE, VDF, CTFE, trifluoroethylene, vinyl fluoride and HFP are preferred, TFE, CTFE and HFP are more preferred, TFE and HFP are still more preferred, and TFE is particularly preferred. The ethylenic fluoromonomer may comprise one or two or more species.

The fluoropolymer to be treated in accordance with the present invention is preferably a copolymer in which the repeating unit (α) derived from a sulfonyl group-containing perhalovinyl ether amounts to 5 to 50 mole percent, the repeating unit (β) derived from an ethylenic fluoromonomer amounts to 50 to 95 mole percent, and the sum of the repeating unit (α) and the repeating unit (β) amounts to 95 to 100 mole percent.

A more preferred lower limit to the content of the repeating unit (α) derived from a sulfonyl group-containing perhalovinyl ether is 7 mole percent, a still more preferred lower limit thereto is 10 mole percent, a more preferred upper limit thereto is 35 mole percent and a still more preferred upper limit thereto is 30 mole percent.

A more preferred lower limit to the content of the repeating unit (β) derived from an ethylenic fluoromonomer is 65 mole percent, a still more preferred lower limit thereto is 70 mole percent, a more preferred upper limit thereto is 90 mole percent and a still more preferred upper limit is 87 mole percent.

The fluoropolymer to be treated in accordance with the present invention may further comprise a repeating unit (γ) derived from a vinyl ether other than the sulfonyl group-containing perhalovinyl ether as a repeating unit derived from a third component monomer other than those mentioned above, more preferably at a content level of not higher than 4 mole percent, still more preferably not higher than 3 mole percent. The vinyl ether other than the sulfonyl group of perhalovinyl ether, which constitutes the repeating unit (γ), is not particularly restricted but may be any of sulfonyl group-free vinyl ethers, for example perfluorovinyl ethers represented by the following general formula (IV):

(IV)

wherein $Rf^2$ represents a fluoroalkyl group of 1 to 9 carbon atoms or a fluoropolyether group of 1 to 9 carbon atoms, or hydrogen-containing vinyl ethers represented by the following general formula (V):

$$CHY^5=CF-O-Rf^3 \qquad (V)$$

wherein $Y^5$ represents H or F and $Rf^3$ represents a straight or branched fluoroalkyl group of 1 to 9 carbon atoms which optionally contain one or more ether groups. One or two or more species of the above vinyl ether may be used.

The fluoropolymer to be treated in accordance with the present invention generally has unstable terminal groups.

The term "unstable terminal group" as used herein refers to one contained in the fluoropolymer to be treated although, literally, the term may be considered to include "readily degradable terminal groups", "fluorinatable terminal groups" and "—$CFTCO_2Z$ groups (T being as defined above, Z representing H, $NR^1R^2R^3R^4$ or an alkali metal element; $R^1$, $R^2$, $R^3$ and $R^4$, which is the same or different, each representing H or an alkyl group of 1 to 4 carbon atoms)", which are generated in the treatment process to be described later herein.

As the unstable terminal groups which the fluoropolymer to be treated in accordance with the present invention may have, there may be mentioned, for example, groups represented by the following formulas (1) to (7):

$$—CFT-R^5(OH)_{n1} \qquad (1)$$

$$—CFT-(R^6)_{n2}—OR^7 \qquad (2)$$

$$—CFT-(R^8)_{n3}—COR^9 \qquad (3)$$

$$—CFT-(R^{10})_{n4}—OCOOR^{11} \qquad (4)$$

$$—CFT-CONR^{12}R^{13} \qquad (5)$$

$$—CFT-COOR^{14} \qquad (6)$$

$$—CFT-R^{15} \qquad (7)$$

(In the above formulas, T represents F or a perfluoroalkyl group of 1 to 10 carbon atoms or a perfluoroalkoxy group of 2 to 15 carbon atoms, $R^5$, $R^6$, $R^7$, $R^8$, $R^9$, $R^{10}$, $R^{11}$ and $R^{14}$ each independently represents a hydrocarbon group of 1 to 10 carbon atoms a part of whose hydrogen atoms is optionally substituted by a halogen element or elements, $R^{12}$, $R^{13}$ and $R^{15}$ each independently represents H or a hydrocarbon group of 1 to 10 carbon atoms whose hydrogen atoms is optionally partly substituted by a halogen element or elements; in the formula (5), $R^{12}$ and $R^{13}$ are the same or different; n1 represents an integer of 1 to 3, n2, n3 and n4 each independently represents an integer of 0 or 1; the perfluoroalkyl group and perfluoroalkoxy group each may contain one or more ether oxygen atoms and/or —$SO_2X$ groups; and X is as defined above.)

The fluoropolymer to be treated in accordance with the present invention may contain further unstable terminal groups other than the above-mentioned unstable terminal groups, for example —$CF_2COOH$, —$CF_2COF$ and/or —$CF=CF_2$, provided that it contains the above-mentioned unstable terminal groups.

As the causes of the formation of the above-mentioned unstable terminal groups and other unstable groups, there may be mentioned, for example, the following:

(i) Groups derived from the polymerization initiator, chain transfer agent and/or polymerization terminator added in the polymerization reaction for obtaining the fluoropolymer to be treated;

(ii) Groups resulting from a unimolecular termination reaction (e.g. β-cleavage of vinyl ether);

(iii) Groups converted, prior to the treatment according to the present invention, from those terminal groups due to water, an alcohol, an amine and/or the like possibly occurring in the ambient environment.

As the groups (i) derived from polymerization initiator, chain transfer agent and/or polymerization terminator, there may be mentioned, for example, the following:

(i-a) —$CF_2OCOOC_3H_7$ (as above mentioned (4)) possibly formed when di-n-propyl peroxydicarbonate is used as the polymerization initiator, etc.

(i-b) —$CF_2CH_2OH$ and —$CF_2CH_2CH_2OH$ (as above mentioned (1)) or —$CF_2COOCH_3$ and —$CF_2COOCH_2CH_3$ (as above mentioned (6)) possibly formed when an alcohol is used as the chain transfer agent or polymerization terminator, etc.

(i-c) —$CF_2CH_2OCH_3$ (as above mentioned (2)) possibly formed when an ether is used as the chain transfer agent, etc.

(i-d) —$CF_2CH_2COCH_3$ (as above mentioned (3)) possibly formed when a ketone is used as the chain transfer agent, etc.

(i-e) —$CF_2CH_2CH_3$ (as above mentioned (7)) possibly formed when a hydrocarbon is used as the chain transfer agent, etc.

(i-f) —$CF_2CONH_2$ (as above mentioned (5)) possibly formed when ammonia is used for the purpose of pH adjustment, among others, etc.

As the groups (ii) resulting from a unimolecular termination reaction, there may be mentioned —$CF_2COF$ and the like.

As the terminal groups (iii) resulting from further conversion of terminal groups once formed in the step of polymerization due to surrounding media, there may be mentioned, for example, the corresponding carboxyl group (—$CF_2CO_2H$) resulting from conversion of the above-mentioned —$CF_2COF$ group due to possibly coexisting water, ester groups (—$CF_2CO_2CH_3$, —$CF_2CO_2C_2H_5$ (above-mentioned (6), etc.) resulting from conversion of the —$CF_2COF$ group due to a possibly coexisting alcohol, amide bond-containing groups (—$CF_2CO_2NH_2$, —$CF_2CO_2N(CH_3)_2$ (above-mentioned (5), etc.)) resulting from conversion of the —$CF_2COF$ group due to an amine or ammonia.

When subjected to the prior art fluorine gas treatment, the unstable terminal groups represented by any of the above formulas (1) to (7) has a problem that the treatment results in insufficient stabilization thereof. The cause is presumably that the above-mentioned unstable terminal groups are readily converted to such terminal groups as —COF and fluorinated ester structures and the terminal groups after such conversion are very stable in fluorine gas, hence the prior art fluorine gas treatment cannot convert them to —$CF_2T$ groups (T being as defined above). Further, in the course of processing to electrolyte membranes, such terminal groups as —COF and fluorinated ester structures are converted to —COOH, causing impairment in the durability of fuel cells.

The present invention has a special significance in that it can cope with the above problem and satisfactorily stabilize fluoropolymers having such unstable terminal groups as mentioned above under mild conditions.

When the fluoropolymer to be treated contains at least one unstable terminal group of the groups represented by the above formulas (1) to (7), the unstable terminal group can be converted to a readily degradable terminal group in the step A to be described later herein and, since the conversion can be carried out even under mild conditions, an —$SO_3H$ group-containing fluoropolymer can be produced with high efficiency. In particular, when the unstable terminal group is a group represented by a formula selected from the group consisting of the above-mentioned formulas (1), (3), (4), (5) and (6), especially in the case of —$CF_2OCOOC_3H_7$, —$CF_2CH_2OH$, —$CF_2COOCH_3$ and —$CF_2CONH_2$, the terminal stabilization according to the present invention can be carried out more readily.

When the fluoropolymer to be treated contains groups represented by at least one formula selected from the group consisting of (2), (4) and (7), effective is such a procedure that comprises subjecting an oxidizing gas such as oxygen to be coexisted in the step A to be mentioned later herein.

The fluoropolymer to be treated is generally a set of a plurality of fluoropolymer to be treated molecules.

The set of a plurality of fluoropolymer to be treated molecules maybe a set of fluoropolymer to be treated molecules having an unstable terminal group and fluoropolymer to be treated molecules free from unstable terminal groups.

In the set of a plurality of fluoropolymer to be treated molecules, there may exist at least one such unstable terminal group as mentioned above. Generally, however, there exist a plurality of such groups.

In the set of a plurality of fluoropolymer to be treated molecules, the plurality of unstable terminal groups may be of a single species or of two or more species. The two or more unstable terminal group species may be contained in each fluoropolymer to be treated molecule or the unstable terminal group species is optionally partly or wholly different in each fluoropolymer to be treated molecule.

The plurality of unstable terminal groups may all be converted in the treatment process according to the present invention to groups of the same species or they may be converted to groups of different species according to the unstable terminal group species, or the plurality of groups may partly remain unconverted.

The fluoropolymer to be treated in accordance with the present invention can be prepared by any of the methods known in the art, for example by solution polymerization, suspension polymerization or emulsion polymerization.

The fluoropolymer to be treated may be in the form of a resin powder, pellets or membranes obtained by molding. From the viewpoint of carrying out the steps to be mentioned later herein in a satisfactory manner, the fluoropolymer to be treated desirably has a resin powder form. From the industrial and handleability viewpoint, however, it desirably occurs as pellets. For avoiding the problems of polymer main chain cleavage and new unstable terminal generation in the step of molding/processing, it preferably has the form of a final molded article, in particular a film or membrane form.

The method for producing an —$SO_3H$ group-containing fluoropolymer (1) according to the present invention comprises subjecting the above-mentioned fluoropolymer to be treated to a procedure comprising at least the following steps A, B and C in that order:
A: Step of reacting with a halogenating agent;
B: Step of reacting with a decomposition treatment agent;
C: Step of reacting with a fluorinating agent.

If desirable, the process may further comprise another step which will not affect its subsequent step between the steps A and B or between the steps B and C, without causing any inconvenience.

Another step may be pelletization or membrane formation, or a chemical reaction step for converting the —$SO_2X$, —$SO_3H$ or other groups in the fluoropolymer to be treated or in the fluoropolymer coming from the preceding step at least partly to the other different groups.

The above-mentioned step A is generally a step A1 of converting the above-mentioned unstable terminal groups to readily degradable groups by reacting with a halogenating agent.

The "readily degradable terminal groups", so referred to herein, are groups resulting from conversion of the unstable terminal groups by reaction with a halogenating agent and capable of being converted to "fluorinatable terminal groups", which are to be described later herein, in the step B by reacting with a decomposition treatment agent.

As the readily degradable terminal groups, there may be mentioned, for example, —$CFTCOX^1$ (T being as defined above and $X^1$ representing F or Cl) and —$CFTCO_2Rx$ (T being as defined above and Rx representing a haloalkyl group).

Preferred as the above —$CFTCOX^1$ are —$CFTCOF$ groups, while preferred as the above —$CFTCOORx$ are those in which Rx is a haloalkyl group of 1 to 3 carbon atoms, more preferably those in which Rx is a perhaloalkyl group of 1 to 3 carbon atoms; —$CFTCOOCX^1{}_3$ groups ($X^1$ being as defined above) and the like are still more preferred, and —$CFTCOOCF_3$ groups are particularly preferred.

When reacted with a halogenating agent in accordance with the present invention, the unstable terminal groups represented by the formula (1), (2), (3), (4), (5) or (7), for instance, can be converted to —$CF_2COF$ and the unstable terminal groups represented by the formula (6) can be converted to —$CF_2COOCX_{n5}H_{3-n5}$ groups (wherein X is F or Cl and n5 is an integer of 1 to 3) resulting from substitution of a halogen atom(s) for the hydrogen atom(s) in the alkyl group —$R^{14}$. In the groups represented by the formula (7), the hydrogen atoms in the alkyl group —$R^{15}$ are substituted by fluorine atoms upon treatment with a halogenating agent. For carrying out the treatment at a relatively low temperature and for a short period of time to attain a sufficient extent of conversion to —$CF_2T$ (T being as defined above), however, a method comprising causing an oxidizing agent such as oxygen to coexist with the halogenating agent to attain the conversion to —$CF_2COX^1$ ($X^1$ being as defined above) is preferred.

In the method for producing an —$SO_3H$ group-containing fluoropolymer according to the present invention, the unstable terminal groups can be efficiently converted to —$CF_2T$ groups even when the fluoropolymer to be treated has an unstable terminal group of at least one species selected from the group consisting of the groups represented by the above formula (1) to (7) since they are converted to —$CF_2COX^1$ or —$COORx$ (in each formula, $X^1$ and Rx being as defined above) by treatment with a halogenating agent, which are further converted to —$CFTCOOZ$ (T and Z being as defined above) by reacting with a decomposition treatment agent, followed by conversion to —$CF_2T$ groups by reacting with a fluorinating agent.

Generally usable as the halogenating agent in the step A are simple substance halogen gases or mixtures thereof, halides represented by $AX_y$ (in which A represents an element serving as the center atom and belonging to any of the groups 15 to 18, PO, SO or $SO_2$, X represents a halogen element, provided that when A is an element of the group 17, X is different from A as a group 17 element; and y represents the valence of A), transition metal perfluorides, etc.

As the halogenating agent, there may be mentioned, for example, $F_2$, $Cl_2$ and $Br_2$ as well as mixtures thereof; $NF_3$, $PF_3$, $PF_5$, $PCl_3$, $PCl_5$, $AsF_5$, $SbF_5$, $OF_2$, $SF_4$, $SCl_2$, $SCl_4$, $ClF$, $ClF_3$, $BrF_3$, $BrF_5$, $IF_5$, $IF_7$, $XeF_2$, $POCl_3$, $SOCl_2$, $AgF_2$, $CoF_3$, $K_3NiF_7$ and $R^{16}R^{17}NSF_3$ ($R^{16}$ and $R^{17}$, which are the same or different, each representing an alkyl group of 1 to 3 carbon atoms) as well as mixtures thereof. The $R^{16}R^{17}NSF_3$ is, for example, $Et_2NSF_3$. Among them, at least one species selected from the group consisting of $F_2$, $Cl_2$, $Br_2$, $NF_3$, $PCl_3$, $PCl_5$, $SF_4$, $SCl_2$, $SCl_4$, $ClF$, $ClF_3$, $BrF_3$, $IF_5$, $POCl_3$, $SOCl_2$ and $R^{16}R^{17}NSF_3$ ($R^{16}$ and $R^{17}$ being as defined above) is used from the ready availability and easy handleability viewpoint; a gaseous fluorinating agent comprising, as a fluorine source, at least one species selected from the group consisting of $F_2$, $NF_3$, $PF_5$, $SF_4$, $IF_5$, $ClF$ and $ClF_3$ is more preferred and $F_2$ is particularly preferred. If necessary, they may be used in admixture with an oxidizing gas such as oxygen.

When it is a gaseous compound, the halogenating agent is preferably used in a form diluted to 1 to 90% by mass with an inert gas such as nitrogen.

In the step (A), the halogenating agent is allowed to react preferably at a temperature not lower than 0° C. but lower than 150° C. A more preferred lower limit to the above temperature is 20° C., a still more preferred lower limit thereto is 50° C., a more preferred upper limit thereto is 140° C. and a still more preferred upper limit thereto is 130° C. By carrying out the reaction with a halogenating agent at a temperature within the above range, it becomes possible to maintain the conversion to readily degradable terminal groups at a high level while preventing carbon-carbon double bond formation, main chain cleavage and other damages to the fluoropolymer to be treated and the formation of unnecessary crosslinked structures, among others.

When a pressure vessel is used together with a gaseous compound, the step A is preferably carried out at a gage pressure of −0.08 to 3 MPa although the optimal pressure may vary depending on the halogenating agent employed, the fluoropolymer to be treated species and other factors. A more preferred lower limit to the above pressure is −0.05 MPa and a more preferred upper limit thereto is 1 MPa.

When a fluorinating agent is used as the halogenating agent, the step A is preferably carried out under conditions such that the target to which the step is applied has a moisture content of 500 ppm by mass or below.

A more preferred upper limit to the moisture content is 450 ppm or below and a still more preferred upper limit thereto is 350 ppm.

Within the above range, a lower limit to the moisture content in the target of the halogenating agent treatment may be set at 0.01 ppm, for instance, from the economy and productivity viewpoint. The moisture content mentioned above is the value obtained by measurement using the Karl Fischer titrimetric method.

When the fluoropolymer to be treated is obtained by emulsion polymerization using an —$SO_2F$ group of monomer, a proportion, though very small, of —$SO_2F$ groups are converted to —$SO_3H$ groups and, further, they may be converted to —$SO_3M$ groups (M representing $NR^1R^2R^3R^4$ or $M^1_{1/L}$ in which $R^1$, $R^2$, $R^3$ and $R^4$ are the same or different and each represents H or an alkyl group of 1 to 4 carbon atoms and $M^1$ represents a metal with a valence of L) due to ammonia and/or the like occurring in the medium, as described in Patent Document 3. Such —$SO_3H$ and —$SO_3M$ groups are highly hygroscopic and, therefore, problems arise on the occasion of reaction with the fluorinating agent under high moisture content conditions: the fluorine source (F) reacts with the water and the fluorination is inhibited. The method of controlling the moisture content in the target fluoropolymer within the above range is not particularly restricted but may be any of the drying methods known in the art, for example the method comprising heating the target polymer, optionally after centrifugation for dehydration, for instance, at 80 to 130° C. for 2 to 50 hours, if desirable while varying the temperature stepwise and/or under reduced pressure; and the method comprising melting the target fluoropolymer in a vented extruder for dehydration through the vent port.

The step B is generally a step of converting the readily degradable terminal groups to fluorinatable terminal groups by reacting with a decomposition treatment agent.

The term "fluorinatable terminal groups" as used herein means terminal groups capable of being readily fluorinated after decomposition of the above-mentioned readily degradable terminal groups.

As the fluorinatable terminal groups, there may be mentioned, among others, groups of the formula:

—$CFTCO_2Z$ wherein T is as defined above and Z represents H, $NR^1R^2R^3R^4$ or an alkali metal element; $R^1$, $R^2$, $R^3$ and $R^4$, which are the same or different, each represents H or an alkyl group of 1 to 4 carbon atoms.

The —$CFTCO_2Z$ groups can be readily converted to —$CF_2T$ groups (T being as defined above) in the step C.

Generally, when such $NR^1R^2R^3R^4$ or alkali metal element as mentioned above, among others, is present in the reaction medium, the Z mentioned above is preferably H from the viewpoint of fluorination efficiency in the step C, although it may influence on the existing $NR^1R^2R^3R^4$ or alkali metal element in the reaction field, among others.

The decomposition treatment agent may be either a liquid decomposition treatment agent or a gaseous decomposition treatment agent, each comprising a mixture containing water, a fluoroalcohol or a mixture thereof; water is particularly preferred as the decomposition treatment agent, however. The readily degradable terminal groups are very highly reactive with water and, in some instances, can be converted to fluorinatable terminal groups upon mere contact with moist air and, therefore, the use of water as the decomposition treatment agent renders the step B simple and easy.

In cases where water is used as the decomposition treatment agent, a water-soluble organic solvent, such as 1,4-dioxane, acetone, monoglyme, diglyme, N-methyl-2-pyrrolidone or N,N-dimethylformamide, may be used according to need.

The amount of the decomposition treatment agent to be used in the step B can be properly selected according to the decomposition treatment agent species employed. When a liquid decomposition treatment agent is used, it is preferably used in an amount of 1 to 10000 parts by mass per 100 parts by mass of the fluoropolymer to be treated after the step A.

The step B is preferably carried out at a temperature of 0 to 180° C. A more preferred lower limit to the temperature is 20° C., a still more preferred lower limit thereto is 50° C., a more preferred upper limit thereto is 170° C., and a still more preferred upper limit thereto is 160° C.

Where a pressure vessel is used, the step B is preferably carried out at a gage pressure of −0.08 to 3 MPa. A more preferred lower limit to that pressure is −0.05 MPa, and a more preferred upper limit is 1 MPa.

The step C is generally a step of converting the fluorinatable terminal groups mentioned above to —$CF_2T$ groups (T being as defined above) by reacting with a fluorinating agent.

The step C is preferably carried out in a condition such that the target with which the fluorinating agent is to react (hereinafter referred to as "fluorinating agent treatment target") is as water-free as possible, preferably under conditions such that the moisture content in the fluorinating agent treatment target is 500 ppm or below of the fluorinating agent treatment target.

At moisture content levels exceeding 500 ppm, when a highly hygroscopic fluoropolymer to be treated, for example a fluoropolymer obtained by emulsion polymerization using an —$SO_2F$-having monomer, is used, the fluorination may be inhibited due to the moisture in the fluorinating agent treatment target, as already described hereinabove.

A more preferred upper limit to the moisture content is 450 ppm, and a still more preferred upper limit thereto is 350 ppm. So long as the moisture content in the fluorinating agent treatment target is within the above range, a lower limit thereto may be set as 0.01 ppm from the economy and productivity viewpoint.

The method of controlling the moisture content in the fluorinating agent treatment target within the above range is not particularly restricted but includes, among others, those methods mentioned hereinabove by way of illustration referring to the step A.

The fluorinating agent to be used in the step C is preferably a fluorinating agent comprising at least one fluorine source selected from the group consisting of $F_2$, $NF_3$, $PF_5$, $SF_4$, $IF_5$, $K_3NiF_7$, ClF and $ClF_3$; the fluorine source is preferably gaseous and $F_2$ is particularly preferred.

The fluorinating agent may be used in the form of a mixture of the above-mentioned fluorine source and a gas desirably inert to fluorination. The inert gas is, for example, nitrogen gas or argon gas.

When it is gaseous, the fluorine source preferably amounts to 1% by mass or more, more preferably 10% by mass or more, of the fluorinating agent. Within the above range, the amount of the fluorine source may be 50% by mass or below. When a gaseous fluorinating agent is used, the step C is preferably carried out at a gage pressure of –0.08 to 3 MPa. A more preferred lower limit to the pressure is a gage pressure of –0.05 MPa, and a more preferred upper limit thereto is 1 MPa.

The step C is preferably carried out at a temperature not lower than 0° C. but lower than 150° C. A more preferred lower limit thereto is 20° C., a still more preferred lower limit is 50° C., a more preferred upper limit is 140° C., and a still more preferred upper limit is 130° C. When the step C is carried out within the above range, the carbon-carbon double bond formation, main chain cleavage and crosslinked structure formation, among others, in the fluoropolymer to be treated can be inhibited while the conversion to —$CF_2T$ (T being as defined above) is maintained at a high level.

The step C can be carried out in the manner of continuous or batchwise operation. The apparatus therefor is properly selected from among stationary reaction vessels such as tray column reaction vessels and can type reaction vessels; rotary (tumbling) reaction vessels such as rotary kilns, double cone reaction vessels and V-shaped blenders; vibrating reaction vessels; fluidized bed reaction vessels such as agitated fluidized bed reaction vessels; and so forth. When the treatment target occurs as a resin powder or pellets, the fluorination treatment is preferably carried out in a rotary reaction vessel or a vibrating reaction vessel in view of the fact that the reaction temperature can then be evenly maintained with ease. When the treatment target has the form of a membrane-shaped molding, it may be treated either in the form of a roll or while being continuously unrolled.

The present invention also includes the method for producing an —$SO_3H$ group-containing fluoropolymer (2) which comprises terminal stabilization treatment of a fluoropolymer to be treated having an —$SO_2X$ group-containing monomer unit (X being as defined above, namely representing F or Cl) and an unstable terminal group and is characterized in that the terminal stabilization treatment comprises the steps P and Q defined below:

P: Step of obtaining an —$SO_3H$ group-containing fluoropolymer in which at least 90% of the unstable terminal groups are —$CFTCO_2Z$ groups;

Q: Step of converting the —$CFTCO_2Z$ groups to —$CF_2T$ groups by reacting with a fluorinating agent.

(The symbols X, T and Z used in reference to the above steps are as defined above.)

In the step P, the term "unstable terminal groups" conceptually includes those unstable terminal groups mentioned hereinabove referring to the fluoropolymer to be treated as well as such unstable terminal groups other than those unstable terminal groups as —$CF_2COOH$, —$CF_2COF$ and —$CF=CF_2$.

In the step P, any procedure may be carried out provided that an —$SO_3H$ group-containing fluoropolymer in which at least 90% of the unstable terminal groups are —$CFTCO_2Z$ groups (T and Z being as defined above) can be obtained. Thus, for example, the steps A and B mentioned above may be carried out in combination as the step P, or the fluoropolymer to be treated maybe brought into contact with an oxidizing agent such as ozone and then the thus-formed —$CF_2COF$ may be hydrolyzed with water or the like. Mention may further be made of the method which comprises treating the fluoropolymer to be treated at an elevated temperature of 200 to 300° C. and then hydrolyzing the resulting —$CF_2COF$ groups with water or the like. When the fluoropolymer to be treated is treated at an elevated temperature of 200 to 300° C., the treatment may be carried out at a reduced pressure of 0.02 MPa or lower and, as for the treatment time, the treatment can be carried out for at least 0.1 hour.

As the fluorinating agent to be used in the step Q, there may be mentioned the same ones as enumerated hereinabove referring to the step C and, among them, $F_2$ is particularly preferred.

Like in the step C, the fluorinating agent is preferably used in a diluted form.

The reaction conditions in the step Q are not particularly restricted but may vary depending on the fluorinating agent employed, the fluoropolymer to be treated species and other factors. It is preferable, however, the reaction be carried out at a pressure of –0.08 to 3 MPa.

The step Q is applied to the fluoropolymer coming from the step P and, therefore, can be carried out at a temperature not lower than 0° C. but lower than 150° C.

A preferred lower limit to the above temperature is 20° C., a more preferred lower limit thereto is 50° C., a preferred upper limit thereto is 140° C., and a more preferred upper limit thereto is 130° C.

The method for producing an —$SO_3H$ group-containing fluoropolymer according to the present invention makes it possible to attain, for example, a number of unstable terminal groups in the —$SO_3H$ group-containing fluoropolymer obtained of 20 or less per $10^6$ carbon atoms. The number of unstable terminal groups can be preferably reduced to 15 or less, more preferably 10 or less, per $10^6$ carbon atoms.

When the method for producing an —$SO_3H$ group-containing fluoropolymer according to the present invention is carried out, the rate of conversion of unstable terminal groups in the fluoropolymer to be treated to —$CF_2T$ groups (T being as defined above; hereinafter such rate of conversion is sometimes referred to as "—$CF_2T$ conversion rate") can amount generally to 90% or higher, more preferably to 95% or higher. In the practice of the present invention, the —$CF_2T$ conversion rate can be further increased, for example, by carrying out the steps A and B or the step P, preferably by carrying out the step A or step P in the temperature range mentioned hereinabove.

The method for producing an —SO$_3$H group-containing fluoropolymer according to the present invention, which includes the above-mentioned respective steps, can inhibit fluoropolymer damaging such as main chain cleavage and unnecessary crosslinked structure formation, which are encountered in the art on the occasion of fluorination with elevated temperature heating.

The above-mentioned fluoropolymer damaging can be sufficiently prevented by controlling the temperature at which the halogenating agent or fluorinating agent is reacted with the fluoropolymer preferably within the range mentioned above in accordance with the present invention.

Generally, the method for producing an —SO$_3$H group-containing fluoropolymer according to the present invention further comprises, in addition to the above mentioned steps A to C or the steps P and Q, a step of hydrolyzing the —SO$_2$X groups (X being as defined above; hereinafter, in this section, the same shall apply).

This step may be carried out either before the step A or step P or after such step. From the viewpoint of the above-mentioned moisture content control in the step of fluorinating agent treatment, however, this step is preferably carried out after completion of all the steps A to C or the steps P and Q.

This step comprises bringing the —SO$_2$X group-containing fluoropolymer coming through the steps A to C or steps P and Q into contact with a strong base such as an aqueous solution of NaOH or KOH, a solution thereof in an organic solvent or a solution thereof in a mixed solvent composed of an organic solvent and water for saponification to thereby convert the —SO$_2$X groups to sulfonium metal salts and, further, after washing with water according to need, converting the sulfonyl metal salts to —SO$_3$H groups by reaction with an acidic solution such as nitric acid, sulfuric acid or hydrochloric acid. When the —SO$_2$X groups are —SO$_2$F groups, for instance, the fluoropolymer is brought into contact with an aqueous solution of NaOH or KOH, a solution thereof in an organic solvent or a solution thereof in a mixed solvent composed of an organic solvent and water to convert the —SO$_2$F groups to —SO$_3$Na or —SO$_3$K groups and, after washing with water according to need, these groups are converted to —SO$_3$H groups by further treatment with an acidic solution.

The —SO$_3$H group-containing fluoropolymer obtained by the method for producing an —SO$_3$H group-containing fluoropolymer according to the present invention also constitutes an aspect of the present invention.

The —SO$_3$H group-containing fluoropolymer according to the present invention is preferable one such that when it is shaped into a membrane and the membrane is subjected to Fenton treatment, namely 2 hours of immersion, at 80° C., of b grams of the —SO$_3$H group-containing fluoropolymer-derived membrane in a liters of an aqueous solution of hydrogen peroxide having an initial iron (II) cation concentration of 2 ppm and an initial hydrogen peroxide concentration of 1% by mass at a film/liquid ratio [b/a] of 3.2, the amount of the fluoride ion eluted is $8.0 \times 10^{-4}$ parts by mass or lower per 100 parts by mass of the —SO$_3$H group-containing fluoropolymer-derived membrane.

When the —SO$_3$H group-containing fluoropolymer gives a fluoride ion amount within the above range, the degree of stabilization of the stabilized fluoropolymer is sufficiently high.

The amount of the fluoride ion eluted upon the above-mentioned Fenton treatment is more preferably $5.0 \times 10^{-4}$ parts by mass or lower, still more preferably $4.0 \times 10^{-4}$ parts by mass or lower, per 100 parts by mass of the —SO$_3$H group-containing fluoropolymer-derived membrane. So long as the amount of the fluoride ion eluted upon Fenton treatment is within the above range, it is industrially allowable that the amount be, for example, $1.0 \times 10^{-5}$ part by mass or higher, preferably $1.0 \times 10^{-4}$ part by mass or higher, per 100 parts by mass of the —SO$_3$H group-containing fluoropolymer-derived membrane.

The fluoride ion amount, so referred to herein, is measured by the "Fenton treatment method" described later herein which comprises assaying using an ion chromatograph (Tosoh Corporation's IC-2001, Tosoh's TSKgel SuperIC-Anion being used as the anion analyzing column).

The —SO$_3$H group-containing fluoropolymer of the present invention can be obtained as a fluoropolymer excellent in chemical stability and various physical properties since it is obtained by the method for producing an —SO$_3$H group-containing fluoropolymer according to the present invention without causing contamination or polymer chain degradation due to corrosion of the apparatus and materials used.

The —SO$_3$H group-containing fluoropolymer of the present invention, which is excellent in chemical stability, as mentioned above, can be used as a material for electrolyte membranes and/or catalyst layers in such fuels cells as solid polymer electrolyte fuel cells generally used under severe conditions.

An —SO$_3$H group-containing fluoropolymer characterized in that a 170-μm-thick membrane formed from the —SO$_3$H group-containing fluoropolymer, upon Fenton treatment, gives an amount of the eluted fluoride ion of $8.0 \times 10^{-4}$ parts by mass or lower per 100 parts by mass of the membrane also constitutes an aspect of the present invention. The amount of the fluoride ion eluted upon Fenton treatment is preferably $2.8 \times 10^{-4}$ parts by mass or lower, more preferably $2.5 \times 10^{-4}$ parts by mass or lower. The —SO$_3$H group-containing fluoropolymer of the present invention, which is such that the amount of the fluoride ion eluted therefrom upon Fenton treatment is within the above range, is extremely excellent in durability when used in the form of electrolyte membranes for fuel cells. So long as the amount of the fluoride ion eluted upon Fenton treatment is within the above range, it is industrially allowable that the amount be, for example, $1.0 \times 10^{-5}$ part by mass or higher, preferably $1.0 \times 10^{-4}$ part by mass or higher, per 100 parts by mass of the —SO$_3$H group-containing fluoropolymer-derived membrane.

The above-mentioned —SO$_3$H group-containing fluoropolymer which is such that when it is shaped into a membrane, the amount of the fluoride ion eluted therefrom upon Fenton treatment is $8.0 \times 10^{-4}$ parts by mass or lower can be obtained by the above-mentioned method for producing an —SO$_3$H group-containing fluoropolymer according to the present invention.

The 170-μm-thick —SO$_3$H group-containing fluoropolymer membrane, so referred to herein, is prepared by the method (1) or (2) mentioned below.

(1) When the —SO$_3$H group-containing fluoropolymer occurs as a powder, the 170-μm-thick membrane is prepared by 20 minutes of heat pressing at 270° C. and 10 MPa.

(2) When the —SO$_3$H group-containing fluoropolymer is in the form of a molded membrane or the like, the molding is placed in an autoclave and heated at 180 to 240° C. in the presence of a 1:1 mixed solvent composed of water and ethanol, and a 170-μm-thick membrane is formed from the thus-obtained liquid by casting.

The polymer electrolyte membrane of the present invention comprises the above-mentioned —SO$_3$H group-containing fluoropolymer of the present invention.

The polymer electrolyte membrane of the present invention, which comprises the above-mentioned —SO$_3$H group-containing fluoropolymer, when used as an electrolyte membrane material for fuel cells, chemical sensors or the like, will not be degraded for a prolonged period of use while such a situation that the F ion generated due to degradation of the membrane material can come into the fuel cell wastewater can be avoided.

The polymer electrolyte membrane of the present invention preferably has a membrane thickness of 5 to 150 μm. When the thickness is less than 5 μm, the mechanical strength of the membrane used in fuel cells readily becomes decreased and the membrane is readily broken in the process of fuel cell operation. Further, the crossleak of hydrogen or oxygen is large, hence the electric energy generation efficiency cannot be improved. Conversely, when the thickness is in excess of 150 μm, the membrane used in fuel cells shows a high membrane resistance and the cells fail to acquire sufficient initial characteristics.

The term "initial characteristics" as used herein refers, among others, to the numerical value of the voltage and the power generation efficiency in a broad current density range as determined by measurement of a current density-voltage curve in fuel cell operation using the polymer electrolyte of the present invention.

A more preferred lower limit to the polymer electrolyte membrane is 10 μm, and a more preferred upper limit thereto is 100 μm.

The polymer electrolyte membrane of the present invention is generally in the form of a membrane made of the —SO$_3$H group-containing fluoropolymer of the present invention.

The molding into the membrane form can be carried out, for example, by T-die molding, inflation molding, calender molding or a like melt molding technique. Since the temperature at which the —SO$_3$H group-containing fluoropolymer can be directly molded is close to the thermal decomposition temperature of the fluoropolymer, such melt molding as mentioned above is preferably carried out with the —SO$_2$X group-containing fluoropolymer after completion of polymerization or the —SO$_2$X group-containing fluoropolymer coming through the above-mentioned steps A, B and C or steps P and Q or the fluoropolymer in the —SO$_3$M form (M representing NR$^1$R$^2$R$^3$R$^4$ or M$^1_{1/L}$ in which R$^1$, R$^2$, R$^3$ and R$^4$ are the same or different and each represents H or an alkyl group of 1 to 4 carbon atoms and M$^1$ represents a metal with a valence of L) (hereinafter referred to as "—SO$_3$M form fluoropolymer").

When the —SO$_2$X group-containing fluoropolymer after completion of polymerization is melt-molded, the fluoropolymer in the membrane form can be subjected to the above-mentioned steps A to C or steps P and Q. When the —SO$_2$X group-containing fluoropolymer is melt-molded into a membrane, the membrane, when subjected to the hydrolyzing treatment mentioned above, can give an —SO$_3$H group-containing fluoropolymer in the membrane form, which can be suitably used as a membrane for fuel cells, among others.

When the fluoropolymer converted to the —SO$_3$M form through the steps A to C or steps P and Q is molded into a membrane form, it is also possible to convert the polymer after molding into the membrane form to an —SO$_3$H group-containing fluoropolymer in the membrane form by acid treatment and/or treatment with water or hot water.

Further, when the —SO$_3$H group-containing fluoropolymer, in such form, is melt-molded into a membrane form, the membrane form is preferably used after further acid treatment and/or treatment with water or hot water according to need, although the membrane can also be used as such.

On the occasion of molding, one or more other ingredients may be incorporated into the —SO$_3$H group-containing fluoropolymer, —SO$_3$M form fluoropolymer or —SO$_2$X group-containing fluoropolymer according to need.

The conditions for the above-mentioned molding can be properly selected according to the molding method employed. In the case of melt molding using a T die, the molten resin temperature is preferably 100 to 400° C., more preferably 200 to 300° C.

As another method of molding the —SO$_3$H group-containing fluoropolymer of the present invention into a membrane (film) form, there may also be mentioned the method comprising casting a fluoropolymer solution for molding onto a support member to form a liquid coated film and removing the liquid medium from the liquid coated film (casting method).

The above-mentioned fluoropolymer solution for molding is not particularly restricted but may be any one resulting from dispersion or dissolution of the fluoropolymer for molding, which is defined hereinbelow, in a liquid medium. It can be obtained, for example, by dispersing or dissolving the fluoropolymer for molding in an appropriate solvent comprising water and/or an alcohol or organic solvent or the like, more preferably by dispersing or dissolving the fluoropolymer in such appropriate solvent at 80 to 300° C. using an autoclave or the like.

On the occasion of dispersing or dissolving the fluoropolymer for molding, a third component(s) or ingredient(s) other than the fluoropolymer for molding may be incorporated. It is also possible to incorporate one or more other components or ingredients in the dispersion or solution obtained.

The above-mentioned fluoropolymer for molding may be any of the above-mentioned —SO$_3$H group-containing fluoropolymer or —SO$_3$M form fluoropolymer, the —SO$_2$X group-containing fluoropolymer after completion of polymerization and the —SO$_2$X group-containing fluoropolymer coming through the above-mentioned steps A to C or steps P and Q.

When the fluoropolymer for molding is an —SO$_3$M form fluoropolymer, the fluoropolymer for molding is molded into a membrane form and the membrane is subjected to acid treatment and treatment with water or hot water, whereby the polymer electrolyte membrane of the present invention can be obtained. When a solution of a fluoropolymer for molding which comprises the —SO$_2$X group-containing fluoropolymer after completion of polymerization is used, the polymer electrolyte membrane of the present invention can be obtained by molding the fluoropolymer for molding into a membrane form and then subjecting the membrane to the above-mentioned steps A-C or steps P and Q, followed by hydrolysis treatment or, when a solution of a fluoropolymer for molding which comprises the —SO$_2$X group-containing fluoropolymer coming through the steps A-C or steps P and Q is used, by molding the fluoropolymer for molding into a membrane form and then subjecting the membrane to hydrolysis.

As for the method of casting the above-mentioned solution of the fluoropolymer for molding onto a support member, those known methods of coating which use a gravure coater, natural roll coater, reverse roll coater, knife coater, dip coater, pipe doctor coater or like coater can be employed.

The support member to be used in casting is not restricted but such common substrates as polymer films, metal foils, alumina and Si can properly be used. In forming membrane/electrode assemblies (to be described later herein), such a support member can be removed from the polymer electrolyte membrane if desirable.

It is also possible to impregnate a porous membrane prepared by stretching treatment of a polytetrafluoroethylene [PTFE] membrane, as described in Japanese Kokoku Publication Hei-05-75835, with a membrane casting liquid and then remove the liquid medium to thereby manufacture a reinforcement (porous membrane)-containing polymer electrolyte membrane. Further, it is also possible to manufacture such fibrillated fiber-reinforced polymer electrolyte membranes as disclosed in Japanese Kokai Publication Sho-53-149881 and Japanese Patent Publication Sho-63-61337, by adding fibrillated fibers made of PTFE or the like to a membrane casting solution and, after casting, removing the liquid medium.

Where desirable, the polymer electrolyte membrane of the present invention may be one obtained by subjecting to heating treatment (annealing) at 40 to 300° C., preferably at 60 to 220° C., more preferably at 80 to 160° C. Furthermore, for fully producing the intrinsic ion exchange performance thereof, the membrane may be subjected to treatment with an acid such as hydrochloric acid or nitric acid, if desired. Further, it is possible to provide the membrane with orientation to stretching in the direction of membrane formation in the membrane formation step, and it is also possible to provide the membrane with drawing and orientation using a transverse uniaxial tenter or a sequential or simultaneous biaxial tenter.

The polymer electrolyte membrane of the present invention can suitably be used as a membrane material for solid polymer electrolyte fuel cells, which are to be described later herein, and further as a membrane material for membranes for lithium cells, membranes for brine electrolysis, membranes for water hydrolysis, membranes for hydrogen halide electrolysis, membranes for oxygen concentration, membranes for humidity sensors, membranes for gas sensors, electrolyte membranes such as separation membranes or ion exchange membranes. Prior to using these, it is also possible to convert the —$SO_3H$ group-containing fluoropolymer of the present invention to an —$SO_3M$ form fluoropolymer according to need.

The electrode catalyst layer of the present invention comprises the above-mentioned —$SO_3H$ group-containing fluoropolymer. The electrode catalyst layer is generally obtained by applying a liquid composition comprising the —$SO_3H$ group-containing fluoropolymer and an active substance as dispersed in a liquid medium to a substrate.

The active substance is not particularly restricted but may be any one capable of being active in the electrode catalyst layer; for example, it may be a catalyst or a carrier-supported catalyst.

The catalyst is not particularly restricted but may be any of those generally used as electrode catalysts; for example, there may be mentioned metals comprising platinum, ruthenium and/or the like, and organometallic complexes generally having a center metal comprising at least one metal species in which at least one center atom is platinum or ruthenium. As the metal comprising platinum, ruthenium and/or the like, there may be mentioned simple substance platinum (platinum black), simple substance ruthenium and platinum-ruthenium alloys, among others. Among them, platinum-containing metal species are preferred.

The carrier for supporting the above catalyst is not particularly restricted but mention may be made of particles of silica, alumina or carbon, for instance. Among them, carbon is particularly preferred since it is excellent in electric conductivity.

As the liquid medium to be used in obtaining the electrode catalyst layer, there may be mentioned, in addition to water, alcohols such as methanol; nitrogen-containing solvents such as N-methylpyrrolidone [NMP]; ketones such as acetone; esters such as ethyl acetate; polar ethers such as diglyme and tetrahydrofuran [THF]; carbonate esters such as diethylene carbonate, and like polar organic solvents when good dispersibility is desired of the particles or solution comprising the —$SO_3H$ group-containing fluoropolymer. These may be used singly or as a mixture of two or more of them.

The above liquid composition comprises at least the —$SO_3H$ group-containing fluoropolymer, together with the above-mentioned active substance and liquid medium and may further contain one or more other ingredients according to need.

As the other ingredients for the purpose of molding a membrane form by casting or impregnation, for instance, there may be mentioned alcohols for improving the leveling properties, polyoxyethylenes for improving the film forming ability, and so forth. It is also possible to use carbon particles or the like, and PTFE and other resin compounds as binders, among others, may also be used singly or in combination.

The substrate mentioned above is not particularly restricted but includes, among others, porous supporting members, resin moldings and metal sheets and, further, electrolyte membranes used in fuel cells, porous carbon electrodes (collectors) and the like are also preferred. The electrolyte membrane mentioned above preferably comprises a fluororesin in an ordinary sense of the term and may also comprise the —$SO_3H$ group-containing fluoropolymer of the present invention. The electrolyte membrane may also be one comprising one or more substances other than a fluororesin in an ordinary sense of the term and/or the —$SO_3H$ group-containing fluoropolymer, provided that the properties of the electrode catalyst layer of the present invention will not be impaired.

The above-mentioned "applying the liquid composition to a substrate" comprises applying the liquid composition to the substrate, if necessary followed by drying and, if desired, further followed by heating at a temperature not lower than the softening point or glass transition point of the —$SO_3H$ group-containing fluoropolymer.

The conditions for the above heating are not particularly restricted provided that the —$SO_3H$ group-containing fluoropolymer and active substance can be immobilized on the substrate; for example, it is preferred that heating be made at 50 to 350° C., more preferably 80 to 160° C., for several minutes, for example 2 to 30 minutes.

For use in a solid polymer electrolyte fuel cell, the electrode catalyst layer of the present invention preferably comprises the —$SO_3H$ group-containing fluoropolymer, carbon and a catalyst (e.g. Pt).

The membrane/electrode assembly of the present invention is a membrane/electrode assembly comprising a polymer electrolyte membrane and electrodes and satisfies at least one requirement selected from the group consisting of the following requirements (1) and (2):

(1) The polymer electrolyte membrane is the polymer electrolyte membrane according to the present invention;
(2) The electrode or electrodes comprise the electrode catalyst layer according to the present invention.

Generally, at least one of the cathode side and anode side electrodes in the above membrane/electrode assembly comprises the above-mentioned electrode catalyst layer of the present invention.

The membrane/electrode assembly of the present invention can be used, for example, in a solid polymer electrolyte fuel cell.

The solid polymer electrolyte fuel cell comprising the membrane/electrode assembly of the present invention also constitutes an aspect of the present invention. The above-mentioned solid polymer electrolyte fuel cell is not particularly restricted provided that it comprises the above-mentioned membrane/electrode assembly and, generally, it may comprise such constituents as electrodes, collectors, a gas diffusion layer and a separator.

When the polymer electrolyte membrane of the present invention is used in a solid polymer electrolyte fuel cell, the polymer electrolyte membrane of the present invention can be used as a membrane/electrode assembly (hereinafter often referred to as "MEA") with that membrane being sandwiched between and held in close contact with an anode and a cathode. Here, the anode comprises an anode catalyst layer and has proton conductivity, and the cathode comprises a cathode catalyst layer and has proton conductivity. In a wide sense, the membrane/electrode assembly includes the one further comprising a gas diffusion layer, which is described later herein, joined to the outside surface of each of the anode catalyst layer and cathode catalyst layer.

The anode catalyst layer contains a catalyst for smooth generation of protons by oxidation of a fuel (e.g. hydrogen), and the cathode catalyst layer contains a catalyst for generation of water by reaction of protons and electrons with an oxidizing agent (e.g. oxygen or air). For each of the anode and cathode, platinum or a platinum-ruthenium alloy is suitably used as the catalyst, preferably in the form of catalyst particles of 10 to 1000 angstroms or smaller in size. Such catalyst particles are preferably supported on conductive particles, about 0.01 to 10 μm in size, of furnace black, channel black, acetylene black, carbon black, active carbon or graphite, for example. The amount of the supported catalyst particles relative to the projected area of the catalyst layer is preferably not smaller than 0.001 mg/cm$^2$ and not larger than 10 mg/cm$^2$.

Furthermore, the anode catalyst layer and cathode catalyst layer preferably contain the —$SO_3H$ group-containing fluoropolymer obtained via polymerization of a sulfonyl group-containing perhalovinyl ether represented by the above general formula (I) given hereinabove and TFE.

As the method of manufacturing MEAs, the following method may be mentioned, for example.

First, the —$SO_3H$ group-containing fluoropolymer is dissolved in a mixed solvent composed of water and an alcohol, and a commercial grade of platinum-supporting carbon (e.g. TEC10E40E, product of Tanaka Kikinzoku Kogyo) is dispersed, as the catalyst, in the resulting solution to give a paste-like matter. This is applied, in a predetermined amount, to one side of each of two PTFE sheets, followed by drying to give a catalyst layer. Then, the polymer electrolyte membrane of the present invention is sandwiched between the two PTFE sheets with the catalyst layer-coated surfaces facing each other, the whole is heated to 100 to 200° C. by means of a hot press for transfer and joining and the PTFE sheets are then removed, whereby an MEA can be obtained. The MEA manufacturing technology is well known to those skilled in the art. Typical methods of manufacturing MEAs are described in detail in the Journal of Applied Electrochemistry, 22 (1992), pp. 1 to 7.

Usable as the gas diffusion layers are commercial carbon cloths or carbon papers. Typical examples of the former are E-tek B-1 carbon cloths (products of De Nora North America, U.S.A.), and typical examples of the latter are CARBEL (registered trademark, product of Japan Gore-Tex, Japan), TGP-H (product of Toray Industries, Japan) and Carbon Paper 2050 (product of SpectraCorp, U.S.A.).

A structure resulting from integration of an electrode catalyst layer and a gas diffusion layer is called "gas diffusion electrode". An MEA can also be obtained by joining the polymer electrolyte membrane of the present invention to a gas diffusion electrode. As a typical example of the commercial gas diffusion electrode, there may be mentioned the gas diffusion electrode ELAT (registered trademark, product of De Nora North America, U.S.A.) in which carbon cloth is used as the gas diffusion layer.

EXAMPLES

The examples and comparative examples as follow illustrate the present invention in further detail. These examples are, however, by no means limitative of the scope of the present invention.

The methods of measurements made in the respective examples and comparative examples were as described below.

1. Functional Group Assaying by IR

A transparent film was obtained by heat pressing each sample at 270° C.

The film obtained was analyzed by Fourier transform infrared spectroscopy in the wave number range of 400 to 4000 cm$^{-1}$. A difference spectrum from the spectrum of a standard sample sufficiently fluorinated so as to show no more substantial difference in spectrum was obtained, the absorbances at the wave numbers ascribable to the respective functional groups were read, and the number of functional groups per 10$^6$ carbon atoms was calculated for each functional group species according to the following formula:

Number of terminal groups per 10$^6$ carbon atoms=$I \times K/t$.

(In the above formula, I is the absorbance, K is the correction factor shown in Table 1, and t is the thickness (in mm) of the film subjected to measurement.)

For —COOH, the sum of the values calculated according to the above formula for the two wave numbers indicative of —COOH as shown in Table 1 was regarded as the number of —COOH groups per 10$^6$ carbon atoms.

When the number of functional groups per 10$^6$ carbon atoms as calculated using the above calculation formula was smaller than 1, the result was regarded as below the detection limit. This does not negate the existence itself of the functional group species in question, however.

TABLE 1

| Unstable terminal group | Wave number (cm$^{-1}$) | Correction factor |
| --- | --- | --- |
| —COF | 1880 | 405 |
| —$CF_2$COOH | 1815 | 455 |
|  | 1779 |  |
| —$CF_2$COOCH$_3$ | 1789 | 355 |
| —$CF_2$CONH$_2$ | 3436 | 480 |
| —$CF_2$CH$_2$OH | 3648 | 2325 |

The Fourier transform infrared spectrometer used for the above-mentioned Fourier transform infrared spectroscopy was Perkin-Elmer's model Spectrum One spectrometer, and the number of scans was 8.

2. Stability Testing using Fenton's Reagent

The polymer electrolyte membrane (b grams) was immersed in an aqueous hydrogen peroxide solution (a liters) having an initial iron(II) cation concentration of 2 ppm and an initial hydrogen peroxide concentration of 1% by mass at a membrane/liquid ratio [b/a] of 3.2 and, after 2 hours of maintenance at 80° C., the fluoropolymer (the above-mentioned polymer electrolyte membrane) was removed, the liquid amount was measured, the liquid was properly diluted with distilled water for ion chromatography, and the amount of the fluoride ion F⁻ was measured by ion chromatography. The measuring apparatus used was IC-2001 (product of Tosoh Corporation, Japan); the anion analyzing column used was TSKgel SuperIC-Anion (product of Tosoh Corporation, Japan). The amount of the fluoride ion eluted was expressed in terms of mass of the fluoride ion eluted per 100 parts by mass of the sample polymer.

3. Method of Measurement of Ion Exchange Equivalent Weight Ew

A 0.1-gram portion of the polymer electrolyte membrane was immersed in 30 ml of a saturated aqueous solution of NaCl at a temperature of 25° C. and allowed to stand there for 30 minutes with stirring, followed by neutralization titration with a 0.01 N aqueous solution of sodium hydroxide; phenolphthalein was used as an indicator and the point at which a pH meter (TPX-90, product of Toko Kagaku Kenkyusho, Japan) indicated a value within the range of 6.95 to 7.05 was regarded as the equivalence point. The Na form electrolyte membrane obtained after neutralization was rinsed with pure water, then dried under vacuum and weighed. The equivalent weight Ew (g/eq) was calculated from the equivalent M (mmol) of sodium hydroxide required for neutralization and the weight W (mg) of the Na form electrolyte membrane using the following formula:

$$Ew = (W/M) - 22.$$

4. Fuel Cell Evaluation

The polymer electrolyte membrane was subjected to fuel cell evaluation in the following manner. First, electrode catalyst layers were produced in the following manner. An electrode ink was prepared by adding 3.31 g of a fluoropolymer solution obtained by preparing a 5% (by mass) fluoropolymer solution in a mixed solvent having a composition (mass ratio) of ethanol and water=50/50, followed by concentration to 11% by mass, to 1.00 g of Pt-carrying carbon (product of Tanaka Kikinzoku Kogyo, Japan; TEC10E40E, Pt 36.41 by weight), followed by further addition of 3.24 g of ethanol and further followed by through mixing up using a homogenizer. The electrode ink was applied onto PTFE sheets in the manner of screen printing. Two coating weight levels were employed so that a coating weight of 0.15 mg/cm² each of the Pt and polymer and a coating weight of 0.30 mg/cm² each of the Pt and polymer might be attained. After application, the coated sheets were dried in air at room temperature for 1 hour and in air at 120° C. for 1 hour to give electrode catalyst layers about 10 μm in thickness. Among these electrode catalyst layers, the one carrying 0.15 mg/cm² each of the Pt and polymer was used as the anode catalyst layer, and the one carrying 0.30 mg/cm² each of the Pt and polymer as the cathode catalyst layer.

The thus-obtained anode catalyst layer and cathode catalyst layer were disposed in a condition facing each other, the polymer electrolyte membrane was sandwiched between them, and the whole was hot-pressed at a temperature of 160° C. and a contact surface pressure of 0.1 MPa for transfer and joining of the anode catalyst layer and cathode catalyst layer to the polymer electrolyte membrane. An MEA was thus manufactured.

(1) Initial Characteristics Measurement

Carbon cloth (product of DE NORA NORTH AMERICA, U.S.A.; ELAT (registered trademark) B-1) was set, as a gas diffusion layer, on each side of the above MEA (on the outside surface each of the anode catalyst layer and cathode catalyst layer), and the whole was incorporated in an evaluation cell. This evaluation cell was set on an evaluation apparatus (product of Toyo Technica, Japan; Fuel cell evaluation system 890CL), the temperature was raised to 80° C. and, then, hydrogen gas was caused to flow on the anode side at a rate of 150 cc/min, and air gas on the cathode side at a rate of 400 cc/min. Using a water bubbling system for gas humidification, hydrogen gas was humidified at 80° C. and air gas at 50° C. and the gases were fed to the cell and, in that state, the current density-voltage curve was measured for initial characteristics investigation.

(2) Durability Testing

After initial characteristics investigation, a durability test was carried out at a cell temperature of 100° C. In each case, the gas humidification temperature was 60° C. for both the anode and cathode. When the cell temperature was 100° C., hydrogen gas was caused to flow on the anode side at a rate of 74 cc/min, and air gas on the cathode side at a rate of 102 cc/min to maintain a pressurized condition, at 0.30 MPa (absolute pressure) on the anode side and 0.15 MPa (absolute pressure) on the cathode side, and cause electric power generation at a current density of 0.3 A/cm². When, on such occasion, the polymer in the membrane and electrodes is degraded, the fluoride ion concentrations in the wastewaters on the anode side and cathode side increase. Therefore, the fluoride ion concentrations in the wastewaters were measured at timed intervals using model 9609BNionplus fluoride ion-selective multiple electrodes (product of Meditorial, Japan) of the model 920Aplus benchtop pH ion meter.

When, in such durability testing, pinholes are formed in the polymer electrolyte membrane, the phenomenon of hydrogen gas leaking in large amounts into the cathode side occurs. To detect the occurrence of this phenomenon, the hydrogen concentration in the cathode side exhaust gas was determined at timed intervals using a micro-GC (CP4900; product of Varian, the Netherlands). At the time when the measured value became at least 10 times the value at the start of measurement, the test was terminated.

5. Melt Index [MI] Measurement Method

The MI of each fluoropolymer was measured using a type C-5059D melt indexer (product of Toyo Seiki Seisakusho, Japan) under the conditions of 270° C. and a load of 2.16 kg according to JIS K 7210. The weight of the polymer extruded was expressed in terms of number of grams per 10 minutes.

EXAMPLE 1

(1) Polymer Synthesis

A 1000-mL stirred type stainless steel autoclave was sufficiently purged with nitrogen and then charged with 310 g of $C_2=CFO(CF_2)_4SO_2F$ and 630 g of HFC43-10mee, and the temperature was adjusted to 35° C. Tetrafluoroethylene [TFE] was fed to the autoclave under pressure until arrival of the gage pressure at 0.27 MPa and, further, 5.6 g of a 5% (by mass) solution of $(C_3F_7CO_2)_2$ in HFC43-10mee was added, as a polymerization initiator, under pressure to initiate the polymerization reaction. For compensating for the amount of TFE consumed by polymerization, TFE was fed continuously under pressure so that the autoclave inside pressure might be maintained at 0.27 MPa. After 3 hours from the start of polymerization, the TFE within the vessel was purged with nitrogen for the inside pressure to return to ordinary pressure. The reaction mixture was taken out of the autoclave, and methanol was added to the reaction mixture, whereupon a solid matter precipitated. This solid was collected by filtration, further washed with HFC43-10mee and dried to give 80 g of a fluoropolymer (1A).

The fluoropolymer 1A had an MI of 5.9 (g/10 minutes). The fluoropolymer 1A was heat-pressed at 270° C. and 10 MPa for 20 minutes to give a transparent membrane with a thickness of 170 μm.

As a result of IR measurement, the fluoropolymer 1A was found to contain 180 —COOCH$_3$ groups and 25 —COF groups per $10^6$ carbon atoms.

Further, the membrane made of the fluoropolymer 1A was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality to give an electrolyte membrane. The Ew of the electrolyte membrane was measured by the above-mentioned equivalent weight Ew measurement method and found to be 936 (g/eq).

(2) Stabilization (2-1) Step A

A 60-g portion of the fluoropolymer 1A was placed in a 300-mL autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous halogenating agent prepared by diluting F$_2$ gas to 20% by mass with nitrogen gas was introduced until arrival of the gage pressure at 0.1 MPa, and the system was maintained in that state for 30 minutes.

Then, the gaseous halogenating agent was exhausted from the autoclave and, after evacuation, a gaseous halogenating agent prepared by diluting F$_2$ gas to 20% by mass with nitrogen gas was introduced until a gage pressure of 0.1 MPa, and the system was maintained in that state for 3 hours.

Thereafter, the system was cooled to room temperature, the gaseous fluorinating agent was exhausted from the autoclave and, after three repetitions of evacuation and nitrogen substitution, the autoclave was opened, and a fluoropolymer (1B) was obtained.

The fluoropolymer 1B was heat-pressed at 270° C. and 10 MPa for 20 minutes to give a transparent membrane with a thickness of 170 μm.

As a result of IR measurement, the fluoropolymer 1B was found to contain 95 —COOCF$_3$ groups and 30 —COF groups per $10^6$ carbon atoms.

(2-2) Step B

A 500-mL stainless steel autoclave was charged with 40 g of the fluorination-treated fluoropolymer 1B and 200 mL of water, and the contents were heated at a vessel inside temperature of 120° C. for 5 hours. After cooling to room temperature, a white solid was taken out and dried in a vacuum drier at 120° C. for 6 hours, whereby 39 g of a fluoropolymer (1C) was obtained.

The fluoropolymer 1C was heat-pressed at 270° C. and 10 MPa for 20 minutes to give a transparent membrane with a thickness of 170 μm.

As a result of IR measurement, the fluoropolymer 1C was found to contain 120 —COOH groups per $10^6$ carbon atoms. No peaks due to unstable terminal groups other than —COOH were observed. It was confirmed that this step gave a fluoropolymer in which almost 100% of the unstable terminal groups were —COOH groups.

(2-3) Step C

The same treatment as in the above-mentioned step A was carried out except that 30 g of the fluoropolymer 1C was used in lieu of 60 g of the fluoropolymer 1A to give a fluoropolymer (1D).

The fluoropolymer 1D had an MI of 5.6 (g/10 minutes). The fluoropolymer 1D was heat-pressed at 270° C. and 10 MPa for 20 minutes to give a transparent membrane with a thickness of 170 μm.

As a result of IR measurement of the membrane obtained, the —COOH content was found to be 10 groups per $10^6$ carbon atoms. No peaks due to unstable terminal groups other than —COOH were observed. Thus, it could be confirmed that the unstable terminal groups originally contained in the fluoropolymer 1A had mostly disappeared.

(3) Saponification

The membrane made of the fluoropolymer 1D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane (1E). The Ew of the electrolyte membrane 1E was measured by the above-mentioned equivalent weight Ew measurement method and found to be 938 (g/eq).

EXAMPLE 2

(1) Polymer Synthesis

A 1000-mL stirred type stainless steel autoclave was sufficiently purged with nitrogen and then charged with 310 g of $C_2$=CFO(CF$_2$)$_4$SO$_2$F, 630 g of HFC43-10mee and 0.15 g of methanol, and the temperature was adjusted to 35° C. Tetrafluoroethylene [TFE] was fed to the autoclave under pressure until arrival of the gage pressure at 0.27 MPa and, further, 5.6 g of a 5% (by mass) solution of $(C_3F_7CO_2)_2$ in HFC43-10mee was added, as a polymerization initiator, under pressure to initiate the polymerization reaction. For compensating for the amount of TFE consumed by polymerization, TFE was fed continuously under pressure so that the autoclave inside pressure might be maintained at 0.27 MPa. After 3.5 hours from the start of polymerization, the TFE within the vessel was purged with nitrogen for the inside pressure to return to ordinary pressure. The reaction mixture was taken out of the autoclave, and methanol was added to the reaction mixture, whereupon a solid matter precipitated. This solid was collected by filtration, further washed with HFC43-10mee and dried to give 75 g of a fluoropolymer (2A).

The fluoropolymer 2A had an MI of 21.0 (g/10 minutes). The fluoropolymer 2A was heat-pressed at 270° C. and 10 MPa for 20 minutes to give a transparent membrane with a thickness of 155 μm.

As a result of IR measurement, the fluoropolymer 2A was found to contain 180 —COOCH$_3$ groups, 30 —COF groups and 60 —CH$_2$OH groups per $10^6$ carbon atoms.

Further, the Ew of the electrolyte membrane was measured by the above-mentioned equivalent weight Ew measurement method and found to be 945 (g/eq).

(2) Stabilization (2-1) Step A

A 60-g portion of the fluoropolymer 2A was placed in a 300-mL autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous halogenating agent prepared by diluting F$_2$ gas to 20% by mass with nitrogen gas was introduced until arrival of the gage pressure at 0.1 MPa, and the system was maintained in that state for 30 minutes.

Then, the gaseous halogenating agent was exhausted from the autoclave and, after evacuation, a gaseous halogenating agent prepared by diluting $F_2$ gas to 20% by mass with nitrogen gas was introduced until a gage pressure of 0.1 MPa, and the system was maintained in that state for 3 hours.

Thereafter, the system was cooled to room temperature, the gaseous fluorinating agent was exhausted from the autoclave and, after three repetitions of evacuation and nitrogen substitution, the autoclave was opened, and a fluoropolymer 2B was obtained.

The fluoropolymer 2B was heat-pressed at 270° C. and 10 MPa for 20 minutes to give a transparent membrane with a thickness of 155 μm.

As a result of IR measurement, the fluoropolymer 2B was found to contain 120 —$COOCF_3$ groups, 80 —COF groups and 20 —COOH groups per $10^6$ carbon atoms.

(2-2) Step B

A 500-mL stainless steel autoclave was charged with 40 g of the fluorination-treated fluoropolymer 2B and 200 mL of water, and the contents were heated at a vessel inside temperature of 120° C. for 5 hours. After cooling to room temperature, a white solid was taken out and dried in a vacuum drier at 120° C. for 6 hours, whereby 39 g of a fluoropolymer 2C was obtained.

The fluoropolymer 2C was heat-pressed at 270° C. and 10 MPa for 20 minutes to give a transparent membrane with a thickness of 160 μm.

As a result of IR measurement, the fluoropolymer 2C was found to contain 170 —COOH groups per $10^6$ carbon atoms. No peaks due to unstable terminal groups other than —COOH were observed. It was confirmed that this step gave a fluoropolymer resulting from almost 100% conversion of the unstable terminal groups originally contained in the fluoropolymer 2B to —COOH groups.

(2-3) Step C

The same treatment as in the above-mentioned step A was carried out except that 30 g of the fluoropolymer 2C was used in lieu of 60 g of the fluoropolymer 2A, to give a fluoropolymer 2D.

The fluoropolymer 2D had an MI of 20.2 (g/10 minutes). The fluoropolymer 2D was heat-pressed at 270° C. and 10 MPa for 20 minutes to give a transparent membrane with a thickness of 160 μm.

As a result of IR measurement of the membrane obtained, the membrane was found to contain 9 —COOH groups and 5 —COF groups per $10^6$ carbon atoms. No peaks due to other unstable terminal groups were observed. Thus, it could be confirmed that the unstable terminal groups originally contained in the fluoropolymer 2A had mostly disappeared.

(3) Saponification

The membrane made of the fluoropolymer 2D was treated in a 20% aqueous solution of sodium hydroxide at 90° C. for 24 hours and then washed with water. The membrane was then treated in 6 N sulfuric acid at 60° C. for 24 hours. Thereafter, the membrane was washed until the washings showed neutrality to give an electrolyte membrane 2E.

COMPARATIVE EXAMPLE 1

A 170-μm-thick membrane obtained by subjecting the fluoropolymer 1B obtained in Example 1 (2-2) to 20 minutes of heat pressing at 270° C. and 10 MPa was treated in the same manner as in Example 1 (3) to give an electrolyte membrane (1ER).

The Ew of the above electrolyte membrane was measured by the above-mentioned equivalent weight Ew measurement method and found to be 940 (g/eq).

EXAMPLE 3

(1) Polymer Synthesis

A 1000-mL stirred type stainless steel autoclave was sufficiently purged with nitrogen and then charged with 230 g of $C_2$=$CFOCF_2CF(CF_3)O(CF_2)_2SO_2F$ and 700 g of HFC43-10mee, and the temperature was adjusted to 35° C. Tetrafluoroethylene [TFE] was fed to the autoclave under pressure until arrival of the gage pressure at 0.17 MPa and, further, 3.7 g of a 5% (by mass) solution of $(C_3F_7CO_2)_2$ in HFC43-10mee was added, as a polymerization initiator, under pressure to initiate the polymerization reaction. For compensating for the amount of TFE consumed by polymerization, TFE was fed continuously under pressure so that the autoclave inside pressure might be maintained at 0.17 MPa. After 3 hours from the start of polymerization, the TFE within the vessel was purged with nitrogen for the inside pressure to return to ordinary pressure. The reaction mixture was taken out of the autoclave, and methanol was added to the reaction mixture, whereupon a solid matter precipitated. This solid was collected by filtration, further washed with HFC43-10mee and dried to give 50.0 of a fluoropolymer 3A.

The fluoropolymer 3A had an MI of 15.9 (g/10 minutes). The fluoropolymer 3A was heat-pressed at 270° C. and 10 MPa for 20 minutes to give a transparent membrane with a thickness of 170 μm.

As a result of IR measurement, the fluoropolymer 3A was found to contain 105 —$COOCH_3$ groups and 30 —COF groups per $10^6$ carbon atoms.

Further, the membrane made of the fluoropolymer 3A was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane. The Ew of the electrolyte membrane was measured by the above-mentioned equivalent weight Ew measurement method and found to be 980 (g/eq).

(2) Stabilization (2-1) Step A

A 37-g portion of the fluoropolymer 3A was placed in a 300-mL autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous halogenating agent prepared by diluting $F_2$ gas to 20% by mass with nitrogen gas was introduced until arrival of the gage pressure at 0.1 MPa, and the system was maintained in that state for 30 minutes.

Then, the gaseous halogenating agent was exhausted from the autoclave and, after evacuation, a gaseous halogenating agent prepared by diluting $F_2$ gas to 20% by mass with nitrogen gas was introduced until a gage pressure of 0.1 MPa, and the system was maintained in that state for 3 hours.

Then, the system was cooled to room temperature, the gaseous halogenating agent was exhausted from the autoclave and, after three repetitions of evacuation and nitrogen substitution, the autoclave was opened, and a fluoropolymer 3B was obtained. The fluoropolymer 3B was heat-pressed at 270° C. and 10 MPa for 20 minutes to give a transparent membrane with a thickness of 170 μm.

As a result of IR measurement, the fluoropolymer 3B was found to contain 90 —COOCF$_3$ groups and 30 —COF groups per 10$^6$ carbon atoms.

(2-2) Step B

A 500-mL stainless steel autoclave was charged with 32 g of the fluorination-treated fluoropolymer 3B and 180 mL of water, and the contents were heated at a vessel inside temperature of 120° C. for 5 hours. After cooling to room temperature, a white solid was taken out and dried in a vacuum drier at 120° C. for 6 hours, whereby a fluoropolymer 3C was obtained.

The fluoropolymer 3C was heat-pressed at 270° C. and 10 MPa for 20 minutes to give a transparent membrane with a thickness of 170 μm.

As a result of IR measurement, the fluoropolymer 3C was found to contain 120 —COOH groups per 10$^6$ carbon atoms. No peaks due to unstable terminal groups other than —COOH were observed. It was confirmed that this step gave a fluoropolymer in which almost 100% of the unstable terminal groups were —COOH groups.

(2-3) Step C

The same treatment as in the above-mentioned step A was carried out except that 24 g of the fluoropolymer 3C was used in lieu of 37 g of the fluoropolymer 3A, to give a fluoropolymer (3D).

The fluoropolymer 1D was heat-pressed at 270° C. and 10 MPa for 20 minutes to give a transparent membrane with a thickness of 170 μm.

As a result of IR measurement of the membrane obtained, the —COOH content was found to be 10 groups per 10$^6$ carbon atoms. No peaks due to unstable terminal groups other than —COOH were observed. Thus, it could be confirmed that the unstable terminal groups originally contained in the fluoropolymer 3A had mostly disappeared.

(3) Saponification

The membrane made of the fluoropolymer 3D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane 3E. The Ew of the electrolyte membrane 3E was measured by the above-mentioned equivalent weight Ew measurement method and found to be 982 (g/eq).

EXAMPLE 4

(1) Polymer Synthesis

A 3000-mL stirred type stainless steel autoclave was sufficiently evacuated and purged with nitrogen and, after sufficient evacuation, charged with 1530 g of perfluorohexane, 3 g of methanol as a chain transfer agent and 990 g of $C_2$=CFOCF$_2$CF$_2$SO$_2$F, and the temperature was adjusted to 25° C. Tetrafluoroethylene [TFE] gas was introduced thereinto under pressure until arrival of the gage pressure at 0.30 MPa and, then, 13.14 g of a 10% (by mass) solution of $(C_3F_7CO_2)_2$ in perfluorohexane was added, as a polymerization initiator, under pressure to initiate the polymerization reaction.

For compensating for the amount of TFE consumed by polymerization, TFE was fed continuously under pressure so that the autoclave inside pressure might be maintained at 0.30 MPa. The polymerization was continued while a total of 47 g of $C_2$=CFOCF$_2$CF$_2$SO$_2$F was fed intermittently.

At the time when the amount of TFE fed arrived at 73 g, the autoclave inside pressure was released to thereby terminate the polymerization.

After completion of the polymerization reaction, 1500 mL of methanol was added to the reaction mixture and the mixture was stirred for 10 minutes. Then, solid-liquid separation was effected using a centrifuge, 1500 mL of methanol was added to the solid fraction, and the whole was stirred for 10 minutes. The polymer was washed by repeating this procedure three times. Then, the thus-washed polymer was deprived of the residual methanol under vacuum at 120° C.; 128 g of a fluoropolymer 4A was obtained.

The fluoropolymer 4A had an MI of 15.2 (g/10 minutes). The fluoropolymer 4A was heat-pressed at 270° C. and 10 MPa for 20 minutes to give a transparent membrane with a thickness of 170 μm.

As a result of IR measurement, the fluoropolymer 4A was found to contain 110 —COOCH$_3$ groups, 10 —COF groups and 65 —CH$_2$OH groups per 10$^6$ carbon atoms.

Further, the membrane made of the fluoropolymer 4A was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality to give an electrolyte membrane. The Ew of the electrolyte membrane was measured by the above-mentioned equivalent weight measurement method and found to be 740 (g/eq).

(2) Stabilization (2-1) Step A

A 100-g portion of the fluoropolymer 3A was placed in a 300-mL autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous halogenating agent prepared by diluting $F_2$ gas to 20% by mass with nitrogen gas was introduced until arrival of the gage pressure at 0.1 MPa, and the system was maintained in that state for 30 minutes.

Then, the gaseous halogenating agent was exhausted from the autoclave and, after evacuation, a gaseous halogenating agent prepared by diluting $F_2$ gas to 20% by mass with nitrogen gas was introduced until a gage pressure of 0.1 MPa, and the system was maintained in that state for 3 hours.

Then, the system was cooled to room temperature, the gaseous halogenating agent was exhausted from the autoclave and, after three repetitions of evacuation and nitrogen substitution, the autoclave was opened, and a fluoropolymer 4B was obtained. The fluoropolymer 4B had an MI of 15.0 (g/10 minutes). The fluoropolymer 4B was heat-pressed at 270° C. and 10 MPa for 20 minutes to give a transparent membrane with a thickness of 170 μm.

As a result of IR measurement, the fluoropolymer 4B was found to contain 90 —COOCF$_3$ groups and 60 —COF groups per 10$^6$ carbon atoms.

(2-2) Step B

The above fluoropolymer 4B was brought into contact with steam under the conditions of 121° C. and atmospheric pressure in a sterilizer (apparatus name: model IST-50, product of Chiyoda Seisakusho) for 6 hours and then the sterilizer was filled with dry nitrogen and allowed to cool to room temperature to give a sample (4C).

The above fluoropolymer 4C was heat-pressed at 270° C. and 10 MPa for 20 minutes to give a transparent membrane with a thickness of 170 μm.

As a result of IR measurement, the fluoropolymer 4C was found to contain 150 —COOH groups per 10$^6$ carbon atoms. No peaks due to unstable terminal groups other than —COOH were observed. It was confirmed that this step gave a fluoropolymer in which almost 100% of the unstable terminal groups were —COOH groups.
(2-3) Step C The same treatment as in the above-mentioned step A was carried out except that 50 g of the fluoropolymer 4C was used in lieu of 100 g of the fluoropolymer 4A, to give a fluoropolymer 4D.

The fluoropolymer 4D had an MI of 14.9 (g/10 minutes). The fluoropolymer 4D was heat-pressed at 270° C. and 10 MPa for 20 minutes to give a transparent membrane with a thickness of 170 μm.

As a result of IR measurement, the fluoropolymer 4D was found to contain 10 —COOH groups per $10^6$ carbon atoms. No other unstable terminal groups were detected. Thus, it could be confirmed that the unstable terminal groups originally contained in the fluoropolymer 4A had mostly disappeared.

(3) Saponification

The membrane made of the fluoropolymer 4D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane 4E. The Ew of the electrolyte membrane 4E was measured by the above-mentioned equivalent weight Ew measurement method and found to be 736 (g/eq).

COMPARATIVE EXAMPLE 2

A 170-μm-thick membrane obtained by subjecting the fluoropolymer 4B obtained in Example 4 (2-1) to 20 minutes of heat pressing at 270° C. and 10 MPa was treated in the same manner as in Example 1 (3) to give an electrolyte membrane (2ER).

EXAMPLE 5

(1) Polymer Synthesis

A fluoropolymer (5A) was obtained in the same manner as in Example 4 except that a methanol solution of (n-$C_3H_7$OCOO)$_2$ was used as the polymerization initiator in lieu of ($C_3F_7$COO)$_2$. As a result of IR measurement, the fluoropolymer 5A was found to contain 60 -OCOO$C_3H_7$ groups, 80 —COO$CH_3$ groups, 11 —COF groups and 38 —$CH_2$OH groups per $10^6$ carbon atoms.

(2) Stabilization
(2-1) Step A

A 100-g portion of the fluoropolymer 5A was placed in a 300-mL autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous halogenating agent prepared by diluting $SF_4$ gas to 50% by mass with nitrogen gas was introduced until arrival of the gage pressure at 0.1 MPa, and the system was maintained in that state for 30 minutes.

Then, the gaseous halogenating agent was exhausted from the autoclave and, after evacuation, a gaseous halogenating agent prepared by diluting $F_2$ gas to 20% by mass with nitrogen gas was introduced until a gage pressure of 0.1 MPa, and the system was maintained in that state for 3 hours.

Then, the system was cooled to room temperature and, after three repetitions of evacuation and nitrogen substitution, the autoclave was opened, and a fluoropolymer 5B was obtained. As a result of IR measurement, the fluoropolymer 5B was found to contain 190 —COF groups per $10^6$ carbon atoms.

(2-2) Step B

The above fluoropolymer 5B was treated in the same manner as in Example 4 (2-2) to give a sample 5C.

The fluoropolymer 5C had an MI of 20 (g/10 minutes).

As a result of IR measurement, the fluoropolymer 5C was found to contain 190 —COOH groups per $10^6$ carbon atoms. No peaks due to unstable terminal groups other than —COOH were observed. It was confirmed that this step gave a fluoropolymer in which almost 100% of the unstable terminal groups were —COOH groups.

(2-3) Step C

The same treatment as in Example 4 (2-1) was carried out except that 50 g of the fluoropolymer 5C was used in lieu of 100 g of the fluoropolymer 5A, to give a fluoropolymer 5D. The fluoropolymer 5D had an MI of 19 (g/10 minutes).

As a result of IR measurement, the fluoropolymer 5D was found to contain 5 —COOH groups per $10^6$ carbon atoms. No other unstable terminal groups were detected. Thus, it could be confirmed that the unstable terminal groups contained in the fluoropolymer 5A had mostly disappeared.

(3) Saponification

A membrane made of the fluoropolymer 5D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane 5E. The Ew of the electrolyte membrane 5E was measured by the above-mentioned equivalent weight Ew measurement method and found to be 736 (g/eq).

EXAMPLE 6

(1) Polymer Synthesis and Stabilization

A fluoropolymer 6A was obtained in the same manner as in Example 4 except that 3 g of diethyl ether was used as the chain transfer agent in lieu of 3 g of methanol.

As result of IR measurement, the fluoropolymer 6A was found to contain —O$CH_2CH_3$, —COF and —COOH groups as unstable terminal groups.

This fluoropolymer 6A was treated in the same manner as in Example 4 (2) in the order of step A, step B and step C to give a fluoropolymer 6D.

As a result of IR measurement, the fluoropolymer 6D was found to contain 10 —COON groups per $10^6$ carbon atoms. No peaks due to other unstable terminal groups were observed.

(2) Saponification

A membrane made of the fluoropolymer 6D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane 6E. The Ew of the electrolyte membrane 6E was measured by the above-mentioned equivalent weight Ew measurement method and found to be 728 (g/eq).

EXAMPLE 7

(1) Polymer Synthesis

A fluoropolymer 7A was obtained in the same manner as in Example 4 except that 100 cc of ethane was used as the chain transfer agent in lieu of 3 g of methanol.

As result of IR measurement, the fluoropolymer 7A was found to contain —CH$_2$CH$_3$, —COF and —COOH groups as unstable terminal groups.

(2) Stabilization

A 100-g portion of the fluoropolymer 7A was placed in a 300-mL autoclave (made of HASTELLOY) and, after three repetitions of evacuation and nitrogen substitution, nitrogen was introduced into the autoclave until a gage pressure of 0 MPa. Then, F$_2$ gas diluted to 20% by mass with nitrogen gas was introduced until arrival of the gage pressure at 0.05 MPa, oxygen gas was further introduced until arrival of the gage pressure at 0.1 MPa, and the system was maintained in that state for 16 hours.

Then, after three repetitions of evacuation and nitrogen substitution, the autoclave was opened, and a fluoropolymer (7B) was obtained.

As a result of IR measurement, the fluoropolymer 7B was found to contain 120 —COF groups per 10$^6$ carbon atoms. This fluoropolymer 7B was treated in the same manner as in Example 4 (2-2) and (2-3) in the order of step B and step C to give a fluoropolymer 7D.

As a result of IR measurement, the fluoropolymer 7D was found to contain 9 —COOH groups per 10$^6$ carbon atoms. No peaks due to other unstable terminal groups were observed.

(3) Saponification

A membrane made of the fluoropolymer 7D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane 7E. The Ew of the electrolyte membrane 7E was measured by the above-mentioned equivalent weight Ew measurement method and found to be 736 (g/eq).

EXAMPLE 8

(1) Polymer Synthesis and Stabilization

A 10-g portion of the fluoropolymer 3A obtained in Example 3 was placed in a quartz boat, which was then placed in a tubular oven. The temperature was raised to 100° C. while nitrogen was passed through the oven. Ozone gas generated in an ozone generator was introduced into the oven and the reaction was allowed to proceed for 2 hours.

Then, the oven was allowed to cool to room temperature while nitrogen gas humidified by bubbling in a gas-washing bottle containing deionized water was introducing thereinto; a fluoropolymer 8P was thus obtained.

As a result of IR measurement, the fluoropolymer 8P was found to contain 10 —COOCH$_3$ groups and 130 —COOH groups per 10$^6$ carbon atoms. It was confirmed that this step gave a fluoropolymer in which almost 93% of the unstable terminal groups contained therein were —COOH groups.

A 5-g portion of the fluoropolymer 8P was placed in a 50-mL autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous fluorinating agent prepared by diluting F$_2$ gas to 20% by mass with nitrogen gas was introduced until arrival of the gage pressure at 0.1 MPa, and the system was maintained in that state for 3 hours.

Then, the autoclave was cooled to room temperature and, after three repetitions of evacuation and nitrogen substitution, the autoclave was opened, and a fluoropolymer 8Q was obtained. As a result of IR measurement, the fluoropolymer 8Q was found to contain 9 —COOH groups per 10$^6$ carbon atoms.

(2) Saponification

A membrane made of the fluoropolymer 8Q was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane 8E. The Ew of the electrolyte membrane 8E was measured by the above-mentioned equivalent weight Ew measurement method and found to be 985 (g/eq).

EXAMPLE 9

(1) Polymer Synthesis

A 100-L glass-lined stirred type autoclave was sufficiently evacuated and purged with nitrogen and, after sufficient evacuation, charged with 50 kg of perfluorohexane, 30 g of methanol as a chain transfer agent and 30 kg of C$_2$=CFOCF$_2$CF$_2$SO$_2$F, and the temperature was adjusted to 25° C. Tetrafluoroethylene [TFE] gas was fed to the autoclave under pressure until arrival of the gage pressure at 0.30 MPa and, further, 50.4 g of a 10% (by mass) solution of the polymerization initiator (C$_3$F$_7$COO)$_2$ in perfluorohexane was added under pressure to initiate the polymerization reaction.

For compensating for the amount of TFE consumed by polymerization, TFE was fed continuously under pressure so that the autoclave inside pressure might be maintained at 0.30 MPa. The polymerization was continued while a total of 3.7 kg of C$_2$=CFOCF$_2$CF$_2$SO$_2$F was fed intermittently.

At the time when the amount of TFE fed arrived at 5.9 kg, the autoclave inside pressure was released to thereby terminate the polymerization.

After completion of the polymerization reaction, 30 L of methanol was added and the resulting mixture was stirred for 10 minutes. Then, solid-liquid separation was performed using a centrifuge, 50 L of methanol was added to the solid fraction, and the mixture was stirred for 10 minutes. The polymer was washed by repeating such procedure three times. Then, the thus-washed polymer was deprived of the residual methanol under vacuum at 120° C.; 8.2 kg of a fluoropolymer 9A was obtained.

The fluoropolymer 9A had an MI of 5.2 (g/10 minutes).

The fluoropolymer 9A was heat-pressed at 270° C. and 10 MPa for 20 minutes to give a transparent membrane with a thickness of 170 μm.

As a result of IR measurement, the fluoropolymer 9A was found to contain 100 —COOCH$_3$ groups, 10 —COF groups and 45 —CH$_2$OH group per 10$^6$ carbon atoms.

(2) Stabilization (2-1) Step A

A 5-kg portion of the fluoropolymer 9A was placed in a 50-L autoclave (made of HASTELLOY), and the temperature was raised to 120° C. while the autoclave was deaerated under vacuum. After three repetitions of evacuation and nitrogen substitution, nitrogen was introduced into the autoclave until a gage pressure of 0 MPa. Then, a gaseous halogenating agent prepared by diluting F$_2$ gas to 20% by mass with nitrogen gas was introduced until arrival of the gage pressure at 0.1 MPa, and the system was maintained in that state for 30 minutes.

Then, the gaseous halogenating agent was exhausted from the autoclave and, after evacuation, a gaseous halogenating agent prepared by diluting F$_2$ gas to 20% by mass with nitrogen gas was introduced until arrival of the gage pressure at 0.1 MPa, and the system was maintained in that state for 3 hours.

Then, after cooling to room temperature, the gaseous halogenating agent was exhausted from the autoclave and, after three repetitions of evacuation and nitrogen substitution, the autoclave was opened, and a fluoropolymer 9B was obtained. The fluoropolymer 9B had an MI of 5.2 (g/10 minutes).

The fluoropolymer 9B was heat-pressed at 270° C. and 10 MPa for 20 minutes to give a transparent membrane with a thickness of 170 μm.

As a result of IR measurement, the fluoropolymer 9B was found to contain 90 —COOCF$_3$ groups and 35 —COF groups per $10^6$ carbon atoms.

(2-2) Step B

The fluoropolymer 9B was stirred in distilled water at a temperature of 25° C. for 1 hour, then filtered off and dried at 100° C. for 16 hours to give a fluoropolymer 9C.

The fluoropolymer 9C was heat-pressed at 270° C. and 10 MPa for 20 minutes to give a transparent membrane with a thickness of 170 μm.

As a result of IR measurement, the fluoropolymer 9C was found to contain 125 —COOH groups per $10^6$ carbon atoms. No peaks due to unstable terminal groups other than —COOH were observed. It was confirmed that this step gave a fluoropolymer in which almost 100% of the unstable terminal groups were —COOH groups.

(2-3) Step C

The same treatment as in the above-mentioned step A was carried out except that 3 kg of the fluoropolymer 9C was used in lieu of 5 kg of the fluoropolymer 9A to give a fluoropolymer 9D.

The fluoropolymer 9D had an MI of 5.1 (g/10 minutes).

Further, the fluoropolymer 9D was melt-molded by extrusion using a T die at 280° C. to give a 50-μm-thick thin membrane.

As a result of IR measurement of the thin membrane obtained, the —COOH content was found to be 10 groups per $10^6$ carbon atoms. No other unstable terminal groups were detected. Thus, it could be confirmed that the unstable terminal groups originally contained in the fluoropolymer 9A had mostly disappeared.

(3) Saponification

The thin membrane made of the fluoropolymer 9D was treated in a 20% aqueous solution of sodium hydroxide at 90° C. for 24 hours and then washed with water. Then, the membrane was treated in 6N sulfuric acid at 60° C. for 24 hours. Thereafter, the membrane was washed with water until the washings showed neutrality, to give an electrolyte membrane 9E. The Ew of the electrolyte membrane 9E was measured by the above-mentioned equivalent weight Ew measurement method and found to be 724 (g/eq).

EXAMPLE 10

The —SO$_3$H group-containing fluoropolymer-made electrolyte membrane 1E of Example 1 was subjected to Fenton treatment according to the method described hereinabove. The fluoride ion elution level was $2.5 \times 10^{-4}$ parts by mass per 100 parts by mass of the membrane.

COMPARATIVE EXAMPLE 3

The —SO$_3$H group-containing fluoropolymer-made electrolyte membrane 1ER of Comparative Example 1 was subjected to Fenton treatment according to the method described hereinabove. The fluoride ion elution level was $5.9 \times 10^{-3}$ parts by mass per 100 parts by mass of the membrane.

COMPARATIVE EXAMPLE 4

The —SO$_3$H group-containing fluoropolymer-made electrolyte membrane 2ER of Comparative Example 2 was subjected to Fenton treatment according to the method described hereinabove. The fluoride ion elution level was $1.0 \times 10^{-3}$ parts by mass per 100 parts by mass of the membrane.

EXAMPLE 11

The —SO$_3$H group-containing fluoropolymer-made electrolyte membrane 2E of Example 2 was subjected to Fenton treatment according to the method described hereinabove. The fluoride ion elution level was $1.7 \times 10^{-4}$ parts by mass per 100 parts by mass of the membrane.

EXAMPLE 12

The —SO$_3$H group-containing fluoropolymer-made electrolyte membrane 3E of Example 3 was subjected to Fenton treatment according to the method described hereinabove. The fluoride ion elution level was $3.9 \times 10^{-4}$ parts by mass per 100 parts by mass of the membrane.

EXAMPLE 13

The —SO$_3$H group-containing fluoropolymer-made electrolyte membrane 4E of Example 4 was subjected to Fenton treatment according to the method described hereinabove. The fluoride ion elution level was $2.6 \times 10^{-4}$ parts by mass per 100 parts by mass of the membrane.

EXAMPLE 14

The —SO$_3$H group-containing fluoropolymer-made electrolyte membrane 5E of Example 5 was subjected to Fenton treatment according to the method described hereinabove. The fluoride ion elution level was $2.8 \times 10^{-4}$ parts by mass per 100 parts by mass of the membrane.

EXAMPLE 15

The —SO$_3$H group-containing fluoropolymer-made electrolyte membrane 6E of Example 6 was subjected to Fenton treatment according to the method described hereinabove. The fluoride ion elution level was $2.4 \times 10^{-4}$ parts by mass per 100 parts by mass of the membrane.

EXAMPLE 16

The —SO$_3$H group-containing fluoropolymer-made electrolyte membrane 7E of Example 7 was subjected to Fenton treatment according to the method described hereinabove. The fluoride ion elution level was $2.2 \times 10^{-4}$ parts by mass per 100 parts by mass of the membrane.

EXAMPLE 17

The —SO$_3$H group-containing fluoropolymer-made electrolyte membrane 8E of Example 8 was subjected to Fenton treatment according to the method described hereinabove. The fluoride ion elution level was $4.1 \times 10^{-4}$ parts by mass per 100 parts by mass of the membrane.

EXAMPLE 18

The —SO$_3$H group-containing fluoropolymer-made electrolyte membrane 9E of Example 9 was subjected to Fenton treatment according to the method described hereinabove.

The fluoride ion elution level was $2.5 \times 10^{-4}$ parts by mass per 100 parts by mass of the membrane.

EXAMPLE 19

An electrolyte polymer obtained from the fluoropolymer 9D produced in Example 9 by subjecting the same to hydrolysis treatment in the same manner as in Example 9 (3) except that the same was used in the form of a powder was treated in water/ethanol in a 5-L autoclave at an inside temperature of 175° C. for 4 hours; a solution having a polymer concentration of 5% relative to the water/ethanol (1/1 by weight) was thus prepared. Using this solution and the above-mentioned fluoropolymer 9D-made electrolyte membrane 9E of Example 9, a membrane/electrode assembly (MEA) was manufactured according to the method mentioned hereinabove.

The above MEA was incorporated in an evaluation cell, and the initial characteristics at a cell temperature of 80° C. were measured according to the method mentioned hereinabove, upon which very high cell performance characteristics were obtained: namely, the voltage (V) and current density (A/cm$^2$) were in the following relationship: 0.76 V at 0.5 A/cm$^2$, 0.67 V at 1.0 A/cm$^2$ and 0.55 V at 1.5 A/cm$^2$. In the durability testing at 100° C., the cell could be operated for 550 hours and the durability was thus great. The fluoride ion concentration in wastewater after the lapse of 50 hours was 0.15 ppm on the cathode side and 0.21 ppm on the anode side. The fluoride ion concentration in wastewater after 400 hours was 0.20 ppm on the cathode side and 0.45 ppm on the anode side.

COMPARATIVE EXAMPLE 5

A portion of the fluoropolymer 9B obtained in Example 9 (2-2) was melt-molded in the manner of extrusion at 280° C. using a T die to give a 50-μm-thick thin membrane. This thin membrane was treated in the same manner as in Example 9 (3) to give an electrolyte membrane 9ER.

Then, an electrolyte polymer obtained from the fluoropolymer 9B produced in Example 9 by subjecting the same to the same treatment as in Example 9 (3) except that the fluoropolymer 9B was in the form of a powder was treated in water/ethanol in a 5-L autoclave at an inside temperature of 175° C. for 4 hours; a solution having a polymer concentration of 5% relative to the water/ethanol (1/1 by weight) was thus prepared. Using this solution and the electrolyte membrane 9ER obtained as described above, a membrane/electrode assembly (MEA) was manufactured according to the method mentioned hereinabove.

The above MEA was incorporated in an evaluation cell, and the initial characteristics at a cell temperature of 80° C. were measured according to the method mentioned hereinabove, upon which the voltage (V) and current density (A/cm$^2$) were in the following relationship: 0.73 V at 0.5 A/cm$^2$, 0.49 V at 1.0 A/cm$^2$ and 0.17 V at 1.5 A/cm$^2$. In the durability testing at 100° C., the cell stopped operating after 125 hours of operation due to cross leakage.

The fluoride ion concentration in wastewater after the lapse of 50 hours was 1.3 ppm on the cathode side and 2.7 ppm on the anode side.

EXAMPLE 20

(1) Polymer Synthesis

A fluoropolymer 20A (8.0 kg) was obtained in the same manner as in Example 9 except that 15 g of methanol was used as the chain transfer agent in lieu of 30 g of methanol.

The fluoropolymer 20A had an MI of 3.6 (g/10 minutes).

The fluoropolymer 20A was heat-pressed at 270° C. and 10 MPa for 20 minutes to give a 170-μm-thick transparent membrane.

As a result of IR measurement, the fluoropolymer 20A was found to contain 80 —COOCH$_3$ groups, 12 —COF groups and 36 —CH$_2$OH groups per $10^6$ carbon atoms.

(2) Stabilization (2-1) Step A

A 7-kg portion of the fluoropolymer 20A was placed in 50-L HASTELLOY-made vibrating reactor (product of Okawara Mfg. Co.) and the temperature was raised to 120° C. with vibration at a frequency of 50 rpm and deaeration under vacuum. After three repetitions of evacuation and nitrogen substitution, nitrogen was introduced into the reactor until a gage pressure of −0.05 MPa. Then, a gaseous halogenating agent prepared by diluting F$_2$ gas to 20% by mass with nitrogen gas was introduced until a gage pressure of 0 MPa, and the system was maintained in that state for 30 minutes.

Then, the gaseous halogenating agent was exhausted from the reactor and, after evacuation, a gaseous halogenating agent prepared by diluting F$_2$ gas to 20% by mass with nitrogen gas was introduced until a gage pressure of 0 MPa, and the system was maintained in that state for 3 hours.

Thereafter, the system was cooled to room temperature, the gaseous halogenating agent was exhausted from the reactor and, after three repetitions of evacuation and nitrogen substitution, a part of the polymer was sampled and thereby a fluoropolymer 20B was obtained.

The fluoropolymer 20B had an MI of 3.3 g (g/10 minutes). The fluoropolymer 20B was heat-pressed at 270° C. and 10 MPa for 20 minutes to give a 170-μm-thick transparent membrane. As a result of IR measurement, the fluoropolymer 20B was found to contain 62 —COOCF$_3$ groups and 30 —COF groups per $10^6$ carbon atoms.

(2-2) Step B

Following the step A, the temperature was raised to 120° C. while the vibrating reactor was vibrated at a frequency of 50 rpm and deaerated under vacuum.

After arrival of the temperature at 120° C., the temperature was returned to ordinary temperature with nitrogen, and nitrogen humidified in a bubbler containing pure water and heated at 80° C. was passed through the reactor at a rate of flow of 5 L·min$^{-1}$ for 4 hours.

Thereafter, the reactor was cooled to room temperature while dry nitrogen was passed therethrough at a flow rate of 5 L·min$^{-1}$, and a part of the polymer was sampled and a fluoropolymer 20C was thus obtained.

The fluoropolymer 20C was heat-pressed at 270° C. and 10 MPa for 20 minutes to give a 170-μm-thick transparent membrane. As a result of IR measurement, the fluoropolymer 20C was found to contain 90 —COOH groups per $10^6$ carbon atoms. No peaks due to unstable terminal groups other than —COOH were observed. It was confirmed that this step gave a fluoropolymer in which almost 100% of the unstable terminal groups contained therein were —COOH groups.

(2-3) Step C

Following the step B, the temperature was raised to 120° C. while the vibrating reactor was vibrated at a frequency of 50 rpm and deaerated under vacuum. After three repetitions of evacuation and nitrogen substitution, nitrogen was introduced until a gage pressure of −0.05 MPa.

Then, a gaseous halogenating agent prepared by diluting $F_2$ gas to 20% by mass with nitrogen gas was introduced until a gage pressure of 0 MPa, and the system was maintained in that state for 30 minutes.

Then, the gaseous halogenating agent was exhausted from the reactor and, after evacuation, a gaseous halogenating agent prepared by diluting $F_2$ gas to 20% by mass with nitrogen gas was introduced until a gage pressure of 0 MPa, and the system was maintained in that state for 3 hours.

Thereafter, the system was cooled to room temperature, the gaseous halogenating agent was exhausted from the reactor and, after three repetitions of evacuation and nitrogen substitution, the reactor was opened and a fluoropolymer 20D was recovered.

The fluoropolymer 20D had an MI of 3.4 (g/10 minutes). Further, the fluoropolymer 20D was melt-molded into a 50-μm-thick membrane by extrusion through a T die at 280° C.

As a result of IR measurement, the fluoropolymer 20D was found to contain 12 —COON groups per $10^6$ carbon atoms. No other unstable terminal groups were detected. Thus, it could be confirmed that the unstable terminal groups contained in the fluoropolymer 20A had mostly disappeared.

(3) Saponification

The thin membrane made of the fluoropolymer 20D was treated in a 20% aqueous solution of sodium hydroxide at 90° C. for 24 hours and then washed with water. Then, the membrane was treated in 6 N sulfuric acid at 60° C. for 24 hours. Thereafter, the membrane was washed with water until the washings showed neutrality, to give an electrolyte membrane (20E). The Ew of the electrolyte membrane 20E was measured by the above-mentioned equivalent weight Ew measurement method and found to be 730 (g/eq).

INDUSTRIAL APPLICABILITY

The method for producing an —$SO_3H$ group-containing fluoropolymer according to the present invention, which has the constitution described hereinabove, can stabilize unstable terminal groups under mild and economical reaction conditions, and further can lighten the restrictions on the apparatus and materials to be used; in each step, the decomposition of the fluoropolymer to be treated hardly occurs and the unnecessary crosslinked structures are hardly generated in the fluoropolymer.

The —$SO_3H$ group-containing fluoropolymer of the present invention, which has been less exposed to contamination resulting from corrosion of the apparatus and materials used, among others, and has not been decomposed in the production process, is excellent in chemical stability and other various characteristics.

The electrode catalyst layer, polymer electrolyte membrane, membrane/electrode assembly and solid polymer electrolyte fuel cell of the present invention, each of which comprises the —$SO_3H$ group-containing fluoropolymer of the present invention, are excellent in various characteristics, in particular in durability, among others.

The invention claimed is:

1. A method for producing an —$SO_3H$ group-containing fluoropolymer comprising terminal stabilization treatment of a fluoropolymer to be treated containing an —$SO_2X$ group-containing monomer unit and an unstable terminal group, wherein the terminal stabilization treatment comprises the steps P and Q defined below:

P: Step of obtaining an —$SO_3H$ group-containing fluoropolymer in which at least 90% of the unstable terminal groups are —$CFTCO_2Z$ groups;

Q: Step of converting the —$CFTCO_2Z$ groups to —$CF_2T$ groups by reacting with a fluorinating agent, and wherein X represents F or Cl, T represents F, a perfluoroalkyl group containing 1 to 10 carbon atoms or a perfluoroalkoxy group containing 2 to 15 carbon atoms and Z represents H or $NR^1R^2R^3R^4$ or an alkali metal element, $R^1$, $R^2$, $R^3$ and $R^4$, each of which is the same or different, represents H or an alkyl group containing 1 to 4 carbon atoms;

said perfluoroalkyl group and perfluoroalkoxy group each optionally contains an ether oxygen [—O—] and/or an —$SO_2X$ group.

2. The method for producing an —$SO_3H$ group-containing fluoropolymer according to claim 1, wherein the fluorinating agent is a fluorinating agent comprising at least one fluorine source selected from the group consisting of $F_2$, $NF_3$, $PF_5$, $SF_4$, $IF_5$, $K_3NiF_7$, ClF and $ClF_3$.

3. The method for producing an —$SO_3H$ group-containing fluoropolymer according to claim 2, wherein the fluorinating agent is gaseous and the fluorine source amounts to 1% by mass or larger of the fluorinating agent.

4. The method for producing an —$SO_3H$ group-containing fluoropolymer according to claim 2, wherein the fluorine source is $F_2$.

5. The method for producing an —$SO_3H$ group-containing fluoropolymer according to claim 1, wherein the fluorinating agent is allowed to react at a temperature not lower than 0° C. but lower than 150° C.

6. The method for producing an —$SO_3H$ group-containing fluoropolymer according to claim 1, wherein the fluoropolymer to be treated is a copolymer based on a repeating unit (α) derived from a sulfonyl group-containing perhalovinyl ether represented by the following general formula (I):

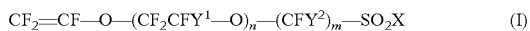

$$CF_2=CF-O-(CF_2CFY^1-O)_n-(CFY^2)_m-SO_2X \quad (I)$$

(wherein, $Y^1$ represents F, Cl or a perfluoroalkyl group, n represents an integer of 0 to 3 and n atoms of $Y^1$ are the same or different; $Y^2$ represents F or Cl, m represents an integer of 2 to 6 and m atoms of $Y^2$ are the same or different; and X is defined above), and a repeating unit (β) derived from an ethylenic fluoromonomer copolymerizable with the sulfonyl group-containing perhalovinyl ether, said repeating unit (α) amounting to 5 to 50 mole percent and said repeating unit (β) amounting to 50 to 95 mole percent in said copolymer, with the sum of the repeating unit (α) and the repeating unit (β) contents being 95 to 100 mole percent.

7. The method for producing an —$SO_3H$ group-containing fluoropolymer according to claim 6, wherein, in the above general formula (I), n is 0 or 1.

8. The method for producing an —$SO_3H$ group-containing fluoropolymer according to claim 6, wherein, in the above general formula (I), $Y^2$ is F and m is an integer of 2 to 6.

9. An —$SO_3H$ group-containing fluoropolymer which is obtained by the method for producing an —$SO_3H$ group-containing fluoropolymer according to claim 2.

10. An —$SO_3H$ group-containing fluoropolymer obtained by the method for producing an —$SO_3H$ group-containing fluoropolymer according to claim 1, wherein a 170-μm-thick membrane made of said —SO$_3$H group-containing fluoropolymer, upon Fenton treatment, gives a fluoride ion elution level of 8.0×10$^{-4}$ parts by mass or lower per 100 parts by mass of said membrane.

11. A polymer electrolyte membrane which comprises the —SO$_3$H group-containing fluoropolymer according to claim 1.

12. An electrode catalyst layer which comprises the —SO$_3$H group-containing fluoropolymer according to claim 1.

13. A membrane/electrode assembly comprising a polymer electrolyte membrane, which assembly satisfies at least one requirement selected from the group consisting of the requirements (1) and (2) given below:
(1) the polymer electrolyte membrane comprises a —SO$_3$H group-containing fluoropolymer obtained by the method of claim 1;
(2) the electrode comprises an electrode catalyst layer comprising a —SO$_3$H group-containing fluoropolymer obtained by the method of claim 1.

14. A solid polymer electrolyte fuel cell which comprises the membrane/electrode assembly according to claim 13.

* * * * *